(12) United States Patent
Triplett

(10) Patent No.: US 12,164,834 B2
(45) Date of Patent: *Dec. 10, 2024

(54) ZONE GROUPING

(71) Applicant: Sonos, Inc., Santa Barbara, CA (US)

(72) Inventor: Mark W. Triplett, St. Charles, IL (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,035

(22) Filed: Sep. 18, 2023

(65) Prior Publication Data

US 2024/0192915 A1 Jun. 13, 2024

Related U.S. Application Data

(63) Continuation of application No. 17/346,546, filed on Jun. 14, 2021, now Pat. No. 11,762,625, which is a continuation of application No. 15/613,471, filed on Jun. 5, 2017, now Pat. No. 11,036,461, which is a continuation of application No. 14/339,249, filed on Jul. 23, 2014, now Pat. No. 9,671,997.

(51) Int. Cl.
*G06F 17/00* (2019.01)
*G06F 3/16* (2006.01)

(52) U.S. Cl.
CPC .................................. *G06F 3/165* (2013.01)

(58) Field of Classification Search
CPC ...................................................... G06F 3/165
USPC ........................................... 715/716; 700/94
See application file for complete search history.

(56) References Cited

U.S. PATENT DOCUMENTS

| 5,182,552 | A | 1/1993 | Paynting |
| 5,440,644 | A | 8/1995 | Farinelli et al. |
| 5,761,320 | A | 6/1998 | Farinelli et al. |
| 5,923,902 | A | 7/1999 | Inagaki |
| 5,946,343 | A | 8/1999 | Schotz et al. |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |

(Continued)

FOREIGN PATENT DOCUMENTS

| EP | 1389853 A1 | 2/2004 |
| EP | 1956601 | 8/2008 |

(Continued)

OTHER PUBLICATIONS

Advisory Action mailed on Dec. 22, 2011, issued in connection with U.S. Appl. No. 11/853,790, filed Sep. 11, 2007, 2 pages.

(Continued)

*Primary Examiner* — Paul C McCord

(57) ABSTRACT

An example method involves causing a control device to display a graphical user interface that comprises an indication of a first zone of a media playback system, wherein the media playback system comprises the first zone and a second zone, and wherein the graphical user interface does not comprise an indication of the second zone. The example method further involves detecting, by the control device, an input that indicates a command to cause the first zone to form a zone group with the second zone and play back a target media in synchrony with the second zone. The method further comprises, based on the detected input, causing the first zone to form a zone group with the second zone and play back the target media in synchrony with the second zone.

20 Claims, 13 Drawing Sheets

(56) References Cited

U.S. PATENT DOCUMENTS

| | | |
|---|---|---|
| 6,522,886 B1 | 2/2003 | Youngs et al. |
| 6,587,127 B1 | 7/2003 | Leeke et al. |
| 6,604,023 B1 | 8/2003 | Brown et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,218,708 B2 | 5/2007 | Berezowski et al. |
| 7,236,773 B2 | 6/2007 | Thomas |
| 7,295,548 B2 | 11/2007 | Blank et al. |
| 7,302,468 B2 | 11/2007 | Wijeratne |
| 7,391,791 B2 | 6/2008 | Balassanian et al. |
| 7,483,538 B2 | 1/2009 | McCarty et al. |
| 7,539,551 B2 | 5/2009 | Komura et al. |
| 7,558,224 B1 | 7/2009 | Surazski et al. |
| 7,571,014 B1 | 8/2009 | Lambourne et al. |
| 7,626,952 B2 | 12/2009 | Slemmer et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,668,990 B2 | 2/2010 | Krzyzanowski et al. |
| 7,742,832 B1 | 6/2010 | Feldman et al. |
| 7,761,176 B2 | 7/2010 | Ben-Yaacov et al. |
| 7,805,210 B2 | 9/2010 | Cucos et al. |
| 7,817,960 B2 | 10/2010 | Tan et al. |
| 7,849,181 B2 | 12/2010 | Slemmer et al. |
| 7,853,341 B2 | 12/2010 | McCarty et al. |
| 7,962,482 B2 | 6/2011 | Handman et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,189,824 B2 | 5/2012 | Strauss et al. |
| 8,234,395 B2 | 7/2012 | Millington |
| 8,239,559 B2 | 8/2012 | Rajapakse |
| 8,271,115 B2 | 9/2012 | Yoshida |
| 8,290,603 B1 | 10/2012 | Lambourne |
| 8,423,893 B2 | 4/2013 | Ramsay et al. |
| 8,483,853 B1 | 7/2013 | Lambourne |
| 8,554,347 B2 | 10/2013 | Suyama et al. |
| 8,700,730 B2 | 4/2014 | Rowe |
| 8,762,565 B2 | 6/2014 | Togashi et al. |
| 8,788,080 B1 | 7/2014 | Kallai et al. |
| 8,942,252 B2 | 1/2015 | Balassanian et al. |
| 8,965,544 B2 | 2/2015 | Ramsay |
| 9,665,339 B2 | 5/2017 | Reimann et al. |
| 2001/0042107 A1 | 11/2001 | Palm |
| 2002/0002039 A1 | 1/2002 | Qureshey et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0054134 A1 | 5/2002 | Kelts et al. |
| 2002/0072816 A1 | 6/2002 | Shdema et al. |
| 2002/0124097 A1 | 9/2002 | Isely et al. |
| 2003/0020763 A1 | 1/2003 | Mayer et al. |
| 2003/0157951 A1 | 8/2003 | Hasty, Jr. |
| 2003/0167335 A1 | 9/2003 | Alexander |
| 2003/0177889 A1 | 9/2003 | Koseki et al. |
| 2003/0198257 A1 | 10/2003 | Sullivan et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0117044 A1 | 6/2004 | Konetski |
| 2004/0131192 A1 | 7/2004 | Metcalf |
| 2004/0223622 A1 | 11/2004 | Lindemann et al. |
| 2004/0225389 A1 | 11/2004 | Ledoux et al. |
| 2005/0002535 A1 | 1/2005 | Liu et al. |
| 2005/0021470 A1 | 1/2005 | Martin et al. |
| 2005/0021590 A1 | 1/2005 | Debique et al. |
| 2005/0131558 A1 | 6/2005 | Braithwaite et al. |
| 2005/0144284 A1 | 6/2005 | Ludwig et al. |
| 2005/0226430 A1 | 10/2005 | Kreifeldt et al. |
| 2005/0254505 A1 | 11/2005 | Chang et al. |
| 2005/0289224 A1 | 12/2005 | Deslippe et al. |
| 2005/0289244 A1 | 12/2005 | Sahu et al. |
| 2006/0041616 A1 | 2/2006 | Ludwig et al. |
| 2006/0149402 A1 | 7/2006 | Chung |
| 2007/0142022 A1 | 6/2007 | Madonna et al. |
| 2007/0142944 A1 | 6/2007 | Goldberg et al. |
| 2007/0189544 A1 | 8/2007 | Rosenberg |
| 2007/0288610 A1 | 12/2007 | Saint et al. |
| 2008/0025535 A1 | 1/2008 | Rajapakse |
| 2008/0045140 A1 | 2/2008 | Korhonen |
| 2008/0066094 A1 | 3/2008 | Igoe |
| 2008/0066120 A1 | 3/2008 | Igoe |
| 2008/0077261 A1 | 3/2008 | Baudino et al. |
| 2008/0144861 A1 | 6/2008 | Melanson et al. |
| 2008/0152165 A1 | 6/2008 | Zacchi |
| 2008/0162668 A1 | 7/2008 | Miller |
| 2009/0097672 A1 | 4/2009 | Buil et al. |
| 2009/0179867 A1 | 7/2009 | Shim et al. |
| 2009/0228919 A1 | 9/2009 | Zott et al. |
| 2011/0314388 A1 | 12/2011 | Wheatley |
| 2013/0014015 A1 | 1/2013 | Lambourne |
| 2013/0076651 A1 | 3/2013 | Reimann et al. |
| 2013/0094667 A1 | 4/2013 | Millington et al. |
| 2013/0111347 A1 | 5/2013 | Reilly et al. |
| 2013/0124993 A1 | 5/2013 | Daisy |
| 2013/0159858 A1 | 6/2013 | Joffray et al. |
| 2013/0191454 A1 | 7/2013 | Oliver et al. |
| 2013/0243199 A1 | 9/2013 | Kallai et al. |
| 2013/0290888 A1 | 10/2013 | Reimann et al. |
| 2013/0317635 A1 | 11/2013 | Bates et al. |
| 2014/0176299 A1 | 6/2014 | Kumar et al. |
| 2014/0181656 A1 | 6/2014 | Kumar et al. |
| 2014/0181659 A1 | 6/2014 | Kumar et al. |
| 2015/0286360 A1 | 10/2015 | Wachter |
| 2016/0063011 A1 | 3/2016 | Wehbi et al. |

FOREIGN PATENT DOCUMENTS

| | | |
|---|---|---|
| WO | 200153994 | 7/2001 |
| WO | 2003093950 A2 | 11/2003 |
| WO | 2005013047 A2 | 2/2005 |
| WO | 2009086599 A1 | 7/2009 |
| WO | 2012137190 A1 | 10/2012 |

OTHER PUBLICATIONS

Advisory Action mailed on Oct. 22, 2019, issued in connection with U.S. Appl. No. 15/613,471, filed Jun. 5, 2017, 3 pages.
Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action mailed on Oct. 1, 2019, issued in connection with European Application No. 15825348.4, 6 pages.
European Patent Office, European Search Report mailed on Oct. 20, 2017, issued in connection with EP Application No. 15825348.4, 8 pages.
European Patent Office, European Search Report mailed on Feb. 22, 2022, issued in connection with European Application No. 21202013.5, 10 pages.
European Patent Office, Summons to Attend Oral Proceedings mailed on Oct. 19, 2020, issued in connection with European Application No. 15825348.4, 9 pages.
Final Office Action mailed Jul. 23, 2014, issued in connection with U.S. Appl. No. 13/896,037, filed May 16, 2013, 12 pages.

(56) References Cited

OTHER PUBLICATIONS

Final Office Action mailed on Feb. 10, 2014, issued in connection with U.S. Appl. No. 13/013,740, filed Jan. 25, 2011, 13 pages.
Final Office Action mailed on Aug. 12, 2019, issued in connection with U.S. Appl. No. 15/613,471, filed Jun. 5, 2017, 13 pages.
Final Office Action mailed on Oct. 13, 2011, issued in connection with U.S. Appl. No. 11/853,790, filed Sep. 11, 2007, 10 pages.
Final Office Action mailed on May 19, 2020, issued in connection with U.S. Appl. No. 15/613,471, filed Jun. 5, 2017, 14 pages.
Final Office Action mailed on Dec. 20, 2016, issued in connection with U.S. Appl. No. 14/339,249, filed Jul. 23, 2014, 17 pages.
First Action Interview Office Action mailed on Aug. 19, 2016, issued in connection with U.S. Appl. No. 14/339,249, filed Jul. 23, 2014, 8 pages.
http://apple.com/ipod-shuffle/ Date accessed: Oct. 15, 2014.
http://www.sonos.com/support/help/3.4/en/Sonos_User_Guide/Chap06_new/Grouping_Zones.htm Date accessed: Oct. 15, 2014.
International Bureau, International Preliminary Report on Patentability, mailed on Oct. 17, 2013, issued in connection with International Application No. PCT/IB2012/052071, filed on Apr. 26, 2012, 7 pages.
International Searching Authority, International Preliminary Report on Patentability mailed on Feb. 2, 2017, issued in connection with International Application No. PCT/US2015/041571, filed on Jul. 22, 2015, 10 pages.
International Searching Authority, International Search Report and Written Opinion mailed on Nov. 5, 2015, issued in connection with International Application No. PCT/US2015/041571, filed on Jul. 22, 2015, 13 pages.
International Searching Authority, International Search Report mailed on Aug. 23, 2012, issued in connection with International Application No. PCT/IB2012/052071, filed on Apr. 26, 2012, 3 pages.
International Searching Authority, Written Opinion mailed on Aug. 23, 2012, issued in connection with International Application No. PCT/IB2012/052071, filed on Apr. 26, 2012, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Non-Final Office Action mailed Jan. 7, 2014, issued in connection with U.S. Appl. No. 13/896,829, filed May 17, 2013, 11 pages.
Non-Final Office Action mailed Feb. 10, 2014, issued in connection with U.S. Appl. No. 13/083,499, filed Apr. 8, 2011, 12 pages.
Non-Final Office Action mailed Jul. 23, 2014, issued in connection with U.S. Appl. No. 14/256,434, filed Apr. 18, 2014, 12 pages.
Non-Final Office Action mailed on Mar. 8, 2011, issued in connection with U.S. Appl. No. 11/853,790, filed Sep. 11, 2007, 10 pages.
Non-Final Office Action mailed on Dec. 18, 2018, issued in connection with U.S. Appl. No. 15/613,471, filed Jun. 5, 2017, 13 pages.
Non-Final Office Action mailed on Jan. 23, 2020, issued in connection with U.S. Appl. No. 15/613,471, filed Jun. 5, 2017, 14 pages.
Non-Final Office Action mailed on Sep. 27, 2013, issued in connection with U.S. Appl. No. 13/013,740, filed Jan. 25, 2011, 12 pages.
Non-Final Office Action mailed on Sep. 28, 2020, issued in connection with U.S. Appl. No. 15/613,471, filed Jun. 5, 2017, 13 pages.
Non-Final Office Action mailed on Oct. 6, 2022, issued in connection with U.S. Appl. No. 17/346,546, filed Jun. 14, 2021, 16 pages.
Notice of Allowability mailed on Apr. 18, 2013, issued in connection with U.S. Appl. No. 11/853,790, filed Sep. 11, 2007, 4 pages.
Notice of Allowance mailed on Jun. 2, 2014, issued in connection with U.S. Appl. No. 13/083,499, filed Apr. 8, 2011, 5 pages.
Notice of Allowance mailed on Jun. 12, 2014, issued in connection with U.S. Appl. No. 13/896,829, filed May 17, 2013, 5 pages.
Notice of Allowance mailed on Feb. 17, 2021, issued in connection with U.S. Appl. No. 15/613,471, filed Jun. 5, 2017, 7 pages.
Notice of Allowance mailed on Feb. 17, 2023, issued in connection with U.S. Appl. No. 17/346,546, filed Jun. 14, 2021, 12 pages.
Notice of Allowance mailed on Jun. 22, 2023, issued in connection with U.S. Appl. No. 17/346,546, filed Jun. 14, 2021, 5 pages.
Notice of Allowance mailed on Apr. 5, 2017, issued in connection with U.S. Appl. No. 14/339,249, filed Jul. 23, 2014, 8 pages.
Palm, Inc., "Handbook for the Palm VII Handheld," May 2000, 311 pages.
Polycom Conference Composer User Guide, copyright 2001, 29 pages.
Preinterview First Office Action mailed on May 18, 2016, issued in connection with U.S. Appl. No. 14/339,249, filed Jul. 23, 2014, 6 pages.
Presentations at WinHEC 2000, May 2000, 138 pages.
Rane: DragNet software; available for sale at least 2006.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 13/864,086, filed Apr. 16, 2013. "Playback Queue Transfer in a Media Playback System" Inventor: Mark W. Triplett, et al.
U.S. Appl. No. 13/937,890, filed Jul. 9, 2013. "Systems and Methods to Provide Play/Pause Content" Inventor: Neil Griffiths, et al.
U.S. Appl. No. 14/040,068, filed Sep. 27, 2013. "Volume Remote" Inventor: Stefan Reichert, et al.
U.S. Appl. No. 14/042,301, filed Sep. 30, 2013. "Fast-resume Audio Playback" Inventor: Vega Luis, et al.
U.S. Appl. No. 14/300,564, filed Jun. 10, 2014. "Providing Media Items from Playback History" Inventor: Amber Brown, et al.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Yamaha DME Designer software manual: Copyright 2004, 482 pages.

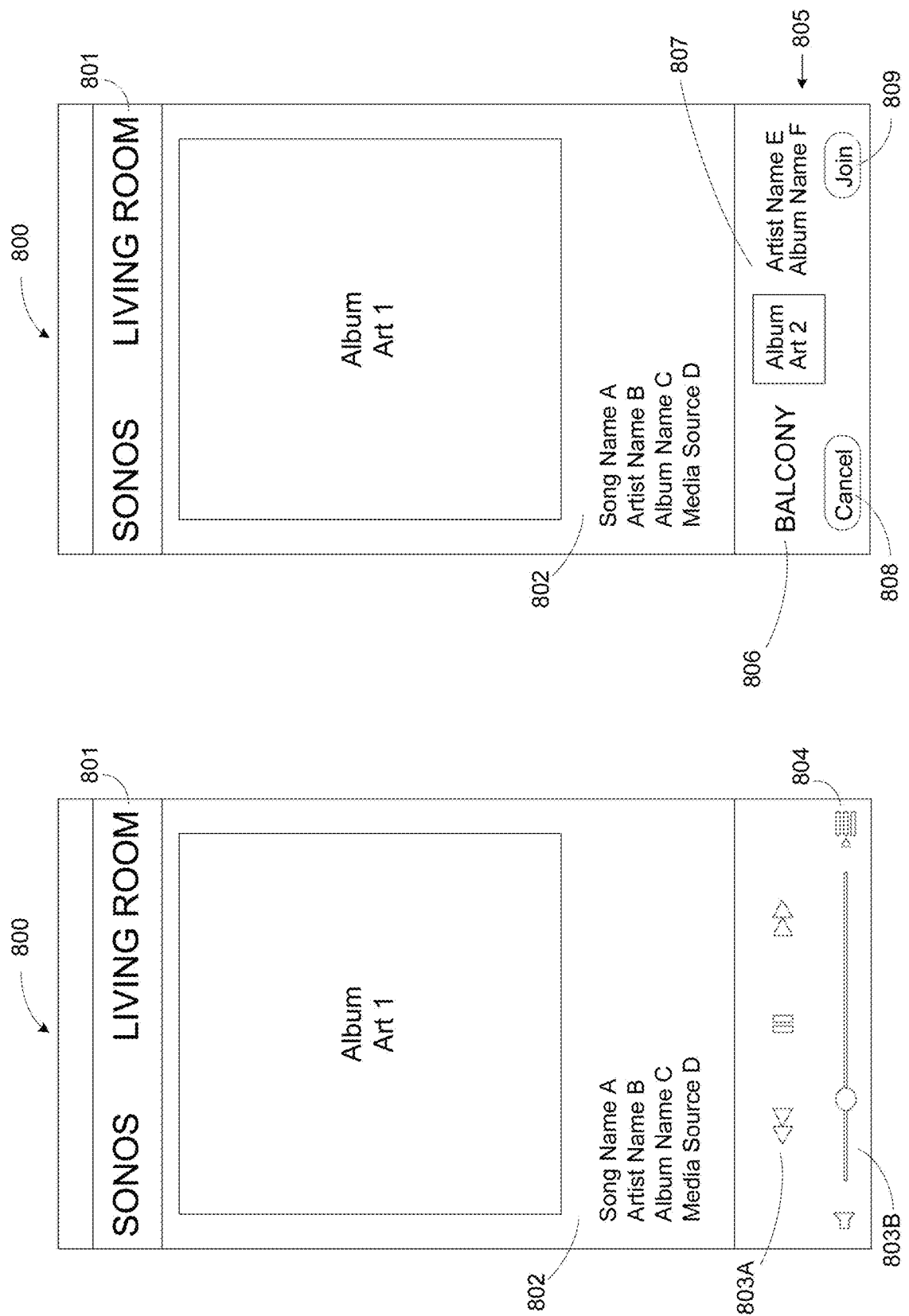

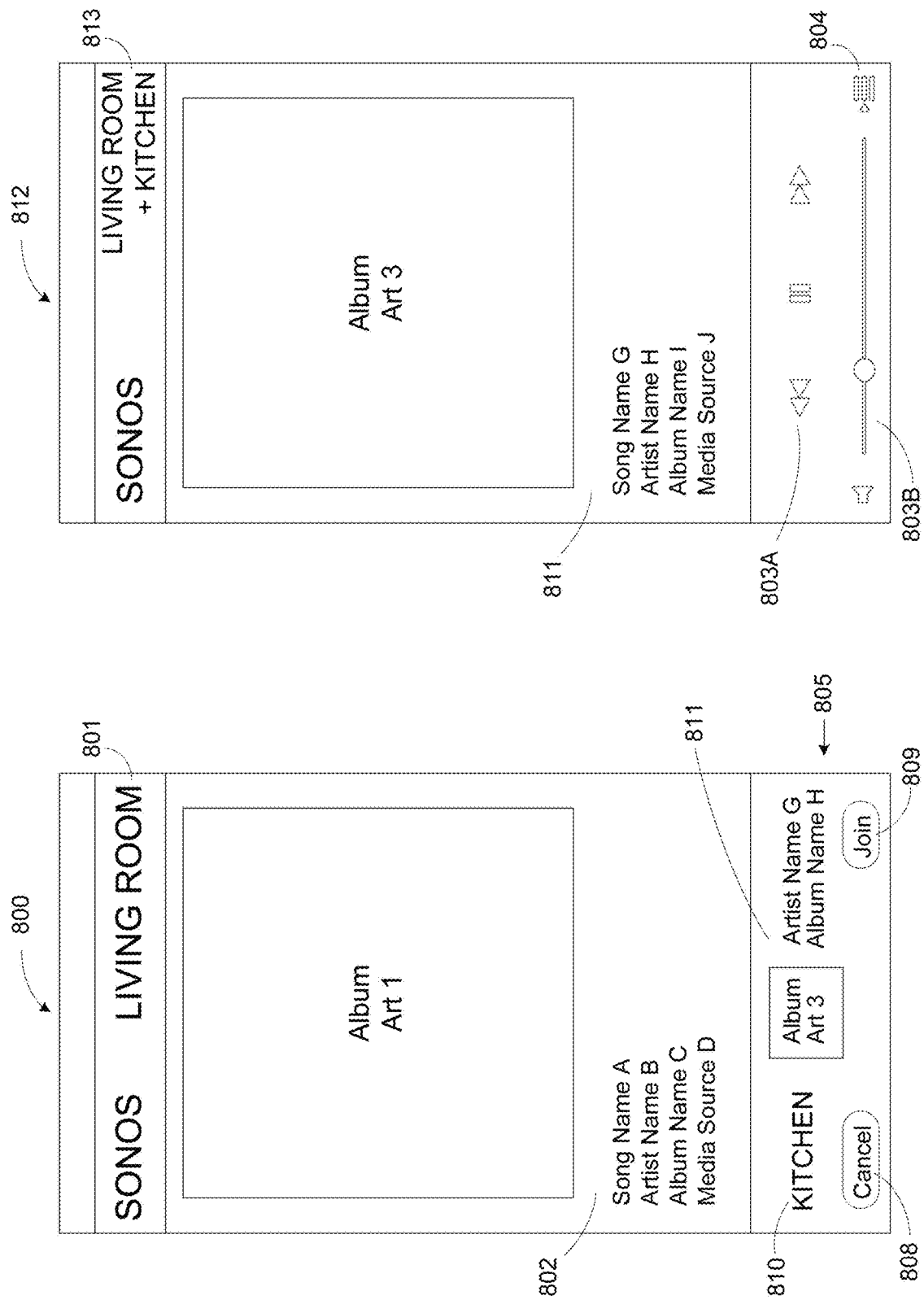

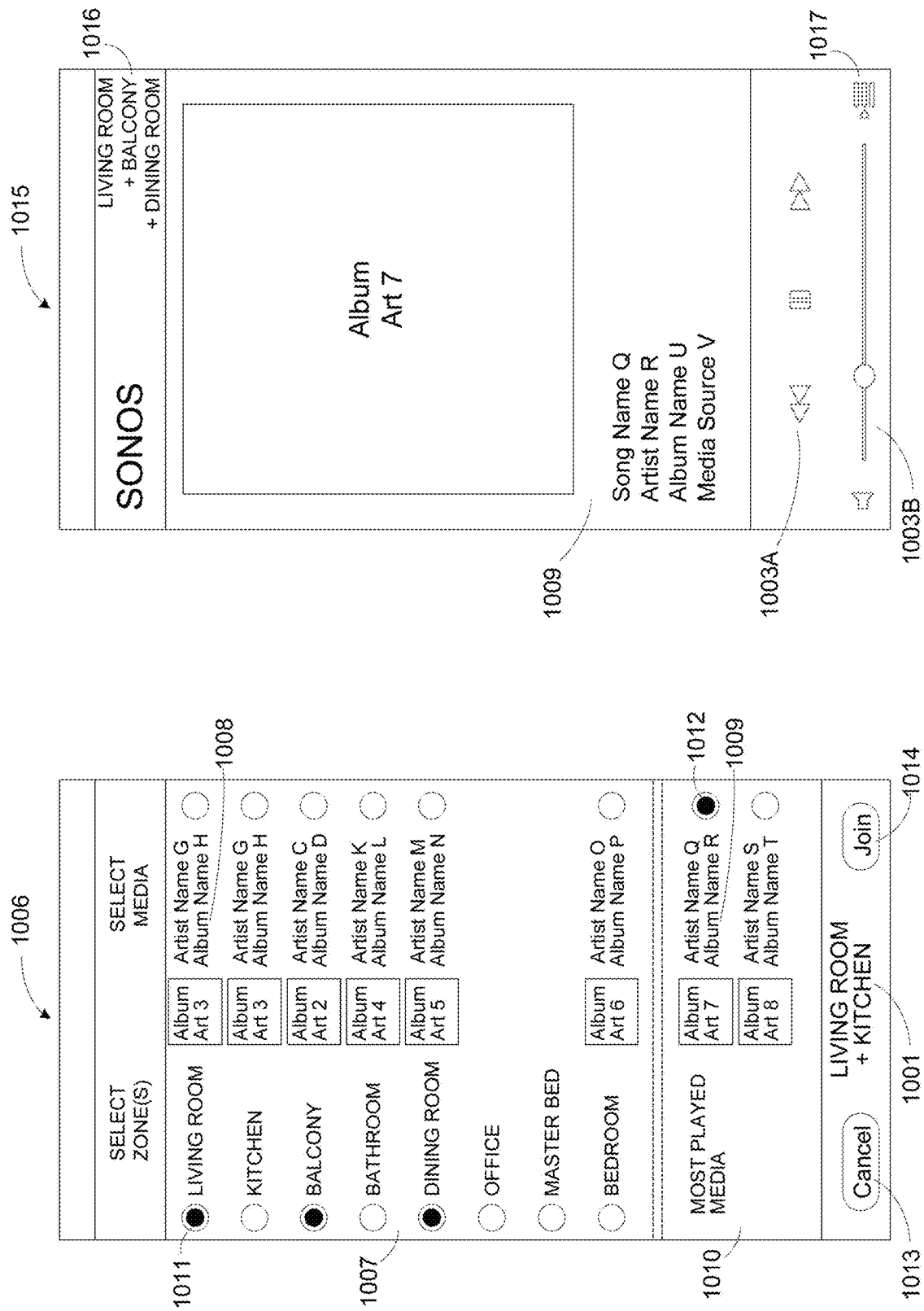

ZONE GROUPING

CROSS REFERENCE TO RELATED APPLICATIONS

The present application is a continuation of U.S. application Ser. No. 17/346,546 filed Jun. 14, 2021, which is a continuation of U.S. application Ser. No. 15/613,471, filed Jun. 5, 2017, and issued as U.S. Pat. No. 11,036,461, which is a continuation of U.S. application Ser. No. 14/339,249, filed Jul. 23, 2014, and issued as U.S. Pat. No. 9,671,997, the disclosures of which are explicitly incorporated by reference herein in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 8A shows an example graphical user interface that includes an indication of a first zone in a media playback system;

FIG. 8B shows an example indication of a determined potential zone displayed via a second graphical user interface;

FIG. 8C shows an example indication of a determined potential zone displayed via a second graphical user interface;

FIG. 8D shows an example display after a zone group has been formed;

FIG. 10B shows display of an example list of potential zones for the first zone to join;

FIG. 10C shows an example display after the zone group has been formed; and

Figure 1:
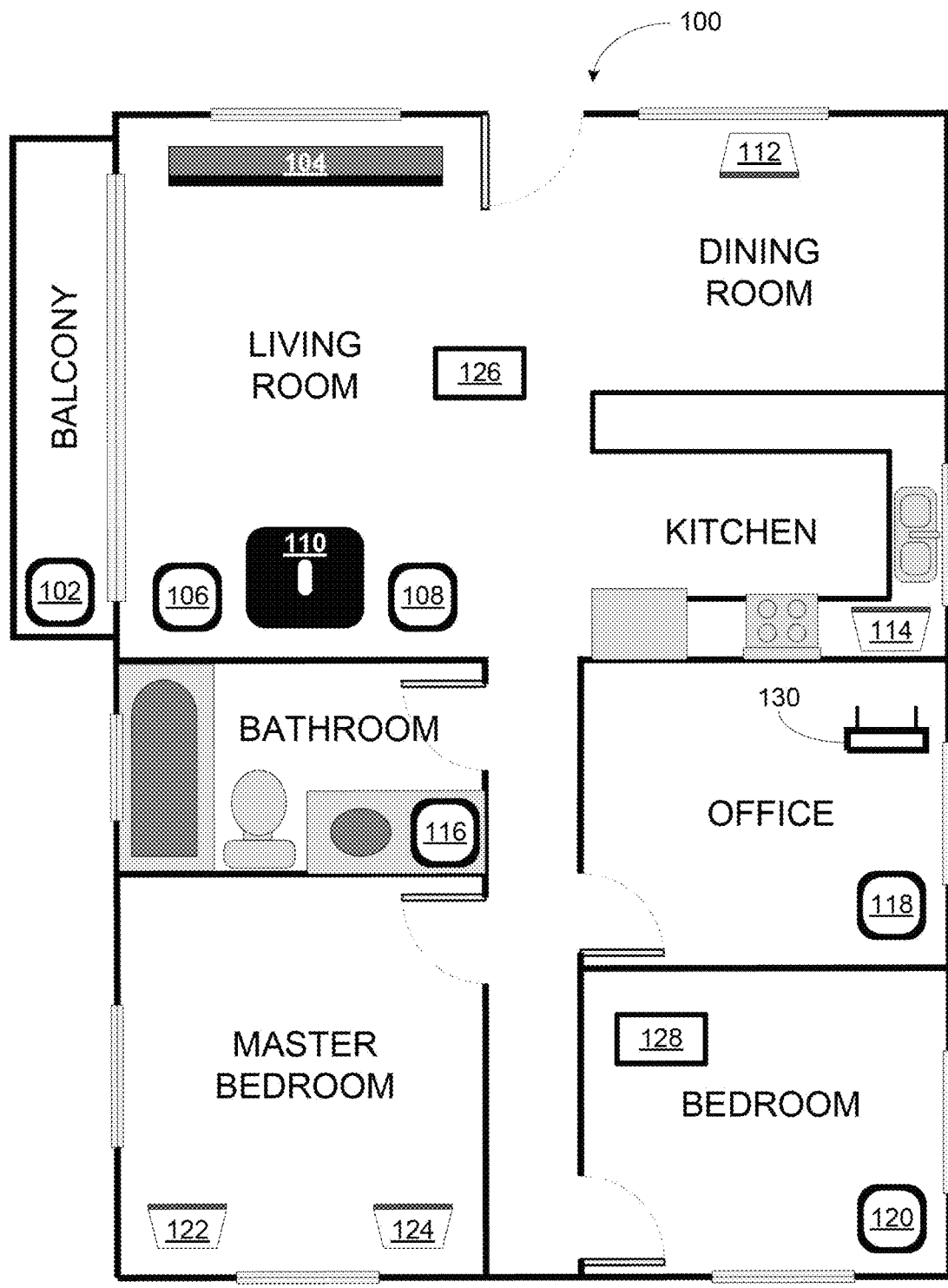
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A media playback system may include multiple playback devices. In some situations, control of the media playback system may occur by way of a control device communicatively coupled to one or more of the playback devices. The control device could be, for example, a smart phone or a tablet computer that is configured to control the playback devices. The control device may provide an interface for control or customization of playback of media by the playback devices in a variety of ways. For example, the control device may respectively associate several playback devices located in a user's home between first and second zones (or more zones) so that playback devices in the first zone (e.g., a living room) play back a first media in synchrony and playback devices in the second zone (e.g., a patio) play back a second media in synchrony. As another example, the control device may control playback volumes corresponding to playback devices of the first and second zones. Other examples of control may exist.

The association of playback devices into zones and the formation of zone groups may sometimes involve several inputs and the interaction with several menus on a graphical user interface of the control device. However, according to some examples described herein, a control device may cause a first zone to form a zone group with a second zone and cause the first and second zones to play back media in synchrony as a result of relatively less interaction with such a graphical user interface.

For instance, the control device may include a graphical user interface that is displaying an indication of a first zone, but not a second zone, within a media playback system. The indication may be a "Now Playing" screen corresponding to the first zone or a menu corresponding to the first zone, among other examples. A specific type of input may be defined as a "Join" input, such as a touch-and-hold on the graphical user interface of the control device. Alternatively, the graphical user interface may include a "Join" button or other such control. An input corresponding to the "Join" input may be detected by the control device and may cause the first playback device to form a zone group with the second zone and may also cause the first zone to playback a target media in synchrony with the second zone. The target media may be the media that the second zone is currently playing at the time of the "Join" input, for instance.

In some examples, the control device may provide the option of confirming that the first zone is to be joined with the second zone. Further, there may be multiple potential zones for the first zone to join. For example, there may be multiple zones in the media playback system that are currently playing back media, and the detection of the input may also cause the control device to detect the active zones. In some cases, the control may, based on the input, detect the potential zones and then determine a second zone based on a predefined consideration. The second zone may be determined based on based on a detected signal strength corresponding to each potential zone, the most recent user interaction time with each potential zone, an alphabetical or numerical order based on a predetermined zone name or zone number, among other possibilities. In other examples, additional input(s) may be detected that confirm the zone group creation or that cause the control device to indicate the potential zones to join.

For instance, according to one particular example, a first input may be a continuous touch-and-hold on the graphical user interface that lasts for a predetermine period of time, such as one second, the detection of which may cause the control device to determine a potential zone to indicate. In some examples, potential zones may be indicated in a sequence, with the control device cycling through the potential zones on a predetermined timer. The second input may then be a release of the graphical user interface, with the second input coinciding in time with the indication of the potential zone to be joined. In this way the second input may both indicate the second zone as well as the command to form the zone group. Among examples, detection of other types of inputs (e.g., a mouse click) is also possible.

The indication of a potential zone to join may take any number of forms. For example, the control device may display an indication of the potential zone on a second graphical user interface, which may take the form of a pop-up window or sub-menu, among other examples. A displayed indication may also include an identification of the media that is currently playing in the potential zone. Alternatively, the control device may provide an audio indication via one or more speakers of playback devices associated with the potential zone. An audio indication may include, as some examples, the name of a potential zone, the name of media currently playing in the zone, or a sample of the media currently playing in the potential zone. Any combination of the indications described above, or other indications, is possible as well.

Further, the order in which a sequence of potential zones is indicated may be determined based on one or more considerations. For instance, the sequence may be determined based on a detected signal strength corresponding to each potential zone, the most recent user interaction time with each potential zone, an alphabetical or numerical order based on a predetermined zone name or zone number, or a random order. Other bases for determining an indication sequence are also possible.

In some examples, the first zone may already be a part of an existing zone group that includes a third zone. After the control device detects the input to form the zone group with the second zone, it may also include the third zone in the newly formed zone group, and may cause the first, second, and third zones to play back media in synchrony. Alternatively, detecting an additional input may cause the control device to display a list of the zones within the existing zone group on the graphical user interface, such that a second input may select which additional zones may join the first and second zones in the new zone group. In another example, the control device may cause all zones in a media playback system to form a zone group and play back media in synchrony. This may be accomplished with a single, specialized "Join All" input, or may be accomplished with a specific type of second input, such as a swipe and release of the graphical user interface, among other examples.

In other examples, a control device may include a first graphical user interface that is displaying an indication of a first zone, but not a second zone, within a media playback system, similar to that described above. Detecting a first input may cause the control device to display a list of potential zones to join on a second graphical user interface, and detecting a second input may cause the first zone to join a second zone and play back a target media in synchrony. As in the examples above, the target media may be media currently playing in the first zone, media currently playing in the second zone, or some other media.

The displayed list of potential zones may include zones in the media playback system that are currently playing back media. Alternatively, the list may include zones that currently have media in a playback queue, but might not necessarily be playing back media. Finally, the list may include every zone in the media playback system. Other lists are also possible. Further, these examples may include many of the additional features described above regarding the inclusion of additional zones from a pre-existing zone group that includes the first zone.

Accordingly, some embodiments described herein generally involve a control device detecting an input that (i) causes a zone group to be formed from two or more zones in a media playback system and (ii) causes the joined zones to play back media in synchrony.

In one aspect, a method is provided. The method involves causing a control device to display a graphical user interface that includes an indication of a first zone of a media playback system, where the media playback system includes the first zone and a second zone, and where the graphical user interface does not include an indication of the second zone; detecting, by the control device, an input that indicates a command to cause (i) the first zone to form a zone group with the second zone and (ii) the first zone and the second zone to play back a target media in synchrony; and based on the detected input, causing (i) the first zone to form a zone group with the second zone and (ii) the first zone and the second zone to play back the target media in synchrony.

In another aspect, a method is provided. The method involves causing a control device to display a first graphical user interface that includes an indication of a first zone of a media playback system, where the media playback system includes the first zone and a second zone, and where the first graphical user interface does not include an indication of the second zone; detecting, by the control device, a first input that indicates a command to cause the control device to display a second graphical user interface that includes a list of potential zones for the first zone to join, where at least one of the potential zones includes the second zone; based on the detected first input, causing the second graphical user interface to display the list of potential zones for the first zone to join, where at least one of the potential zones includes the second zone; detecting, by the control device, a second input that indicates a command to cause (i) the first zone to form a zone group with the second zone and (ii) the first zone and the second zone to play back a target media in synchrony; and based on the detected second input, causing (i) the first zone to form a zone group with the second zone and (ii) the first zone and the second zone to play back the target media in synchrony.

In yet another aspect, a device is provided. The device includes a processor, a network interface, a graphical user interface, a non-transitory computer readable medium, and program instructions stored on the non-transitory computer readable medium executable by the processor to cause the control device to perform functions, where the functions include: causing the control device to display the graphical user interface that includes an indication of a first zone of a media playback system, where the media playback system includes the first zone and a second zone, and where the graphical user interface does not include an indication of the second zone; detecting, by the control device, an input that indicates a command to cause (i) the first zone to form a zone group with the second zone and (ii) the first zone and the second zone to play back a target media in synchrony; and, based on the detected input, causing (i) the first zone to form a zone group with the second zone and (ii) the first zone and the second zone to play back the target media in synchrony.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
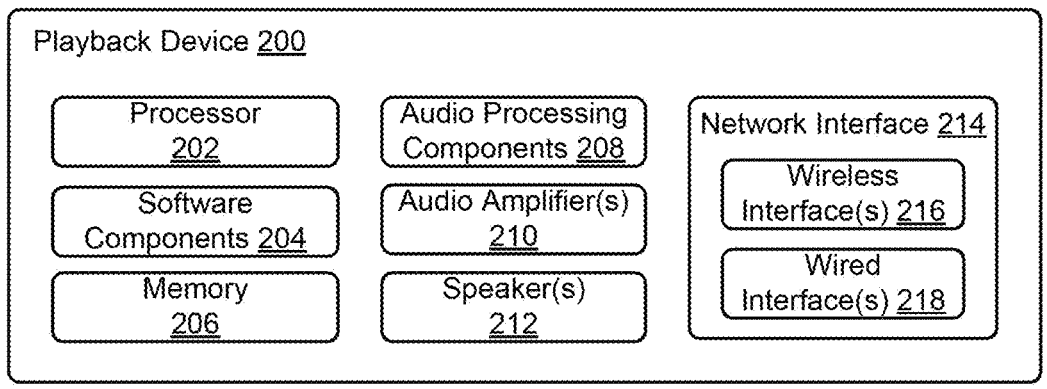
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g. 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e., a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
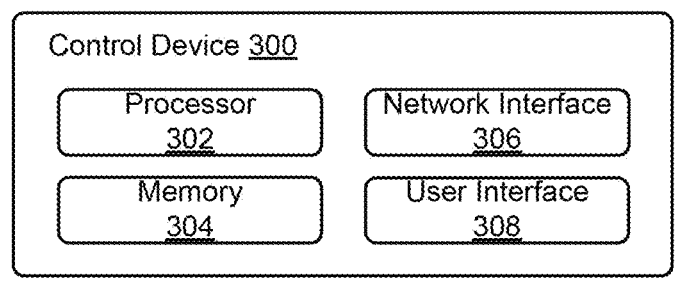
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
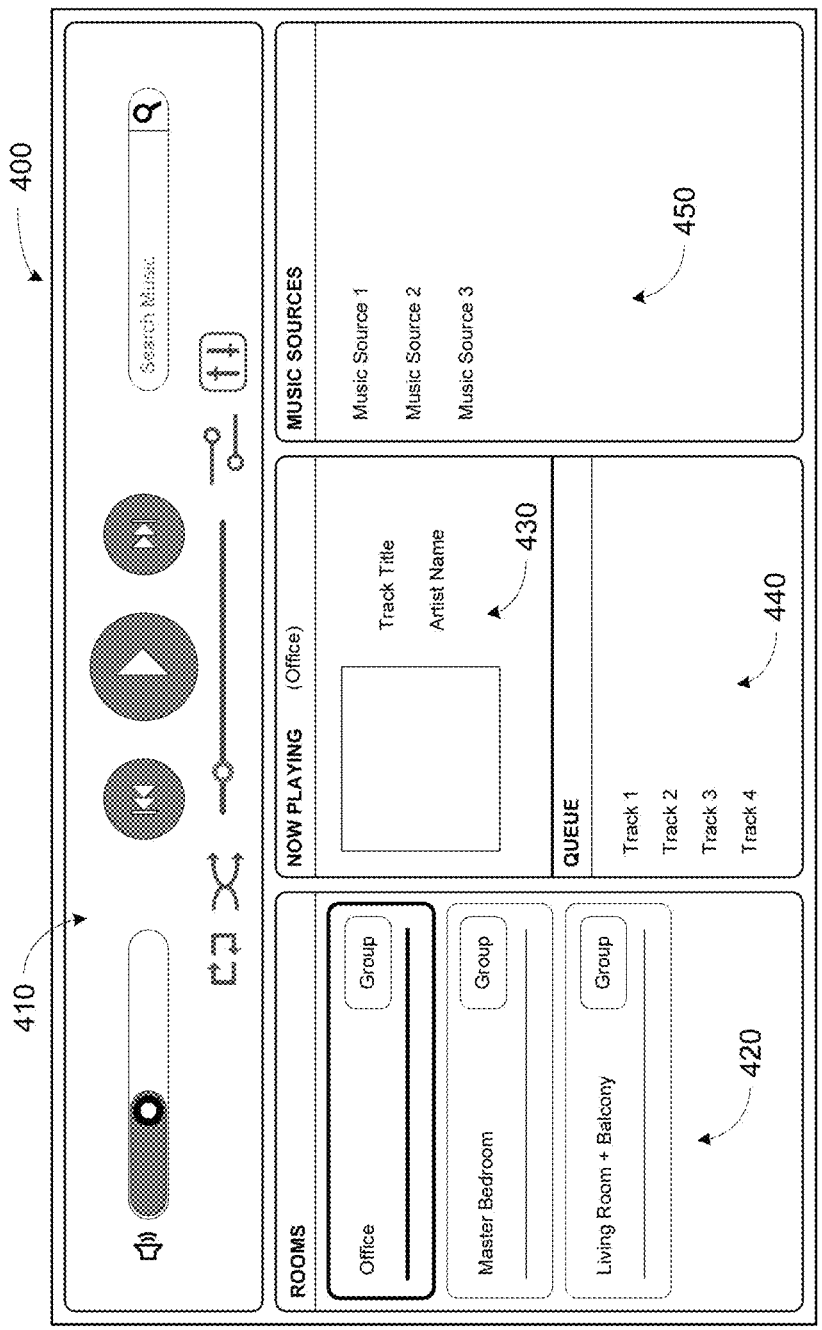
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Controlling a Media Playback System

As discussed above, some embodiments described herein involve, among other things, a control device detecting an input that (i) causes a zone group to be formed from two or more zones in a media playback system and (ii) causes the grouped zones to play back media in synchrony. Other aspects of the embodiments will be made apparent in the remainder of the description herein.

In this section the term "computing device" may have the same meaning as the terms "network device" and/or "controller device" used in previous sections, unless it is clear from context that this is not the case. The term "server" may also be used interchangeably with the term "server device." Terminology such as "server," "server device," "controller," "controller device," "network device," and "computing device" are generally used for explanatory purposes in this disclosure and are not meant to be limiting. One of skill in the art will recognize that any suitable computing device may perform various functions disclosed herein and that the preceding list of terms is non-exhaustive.

Figure 5:
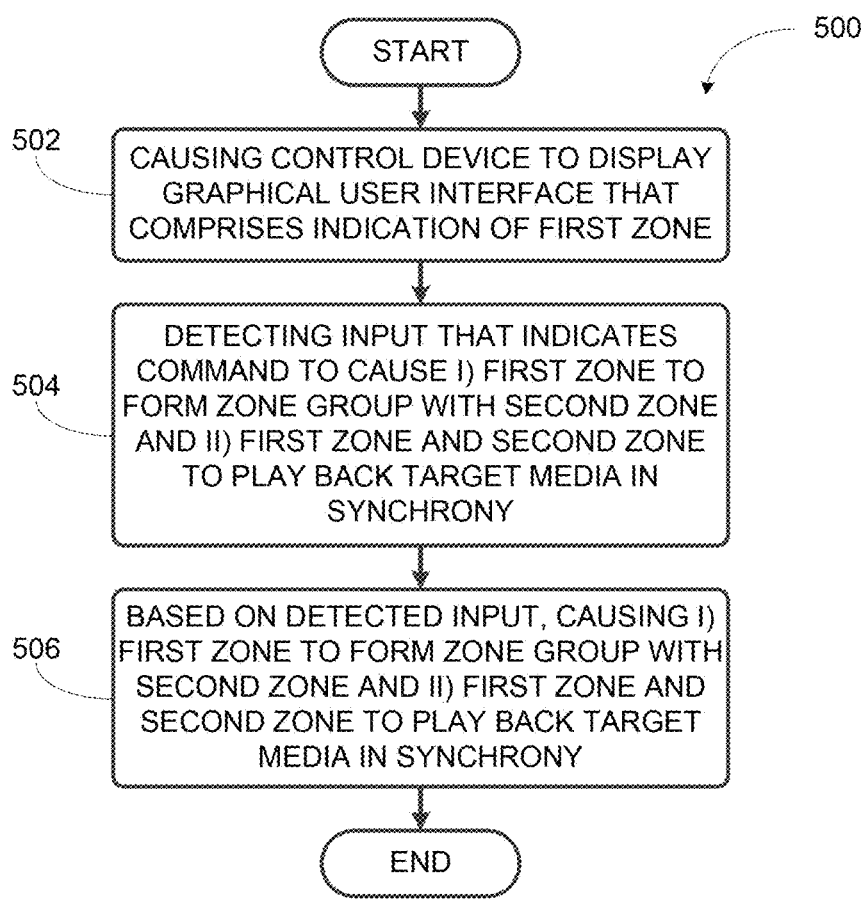
FIG. 5 shows an example flow diagram for an example method to facilitate zone grouping.
Figure 7:
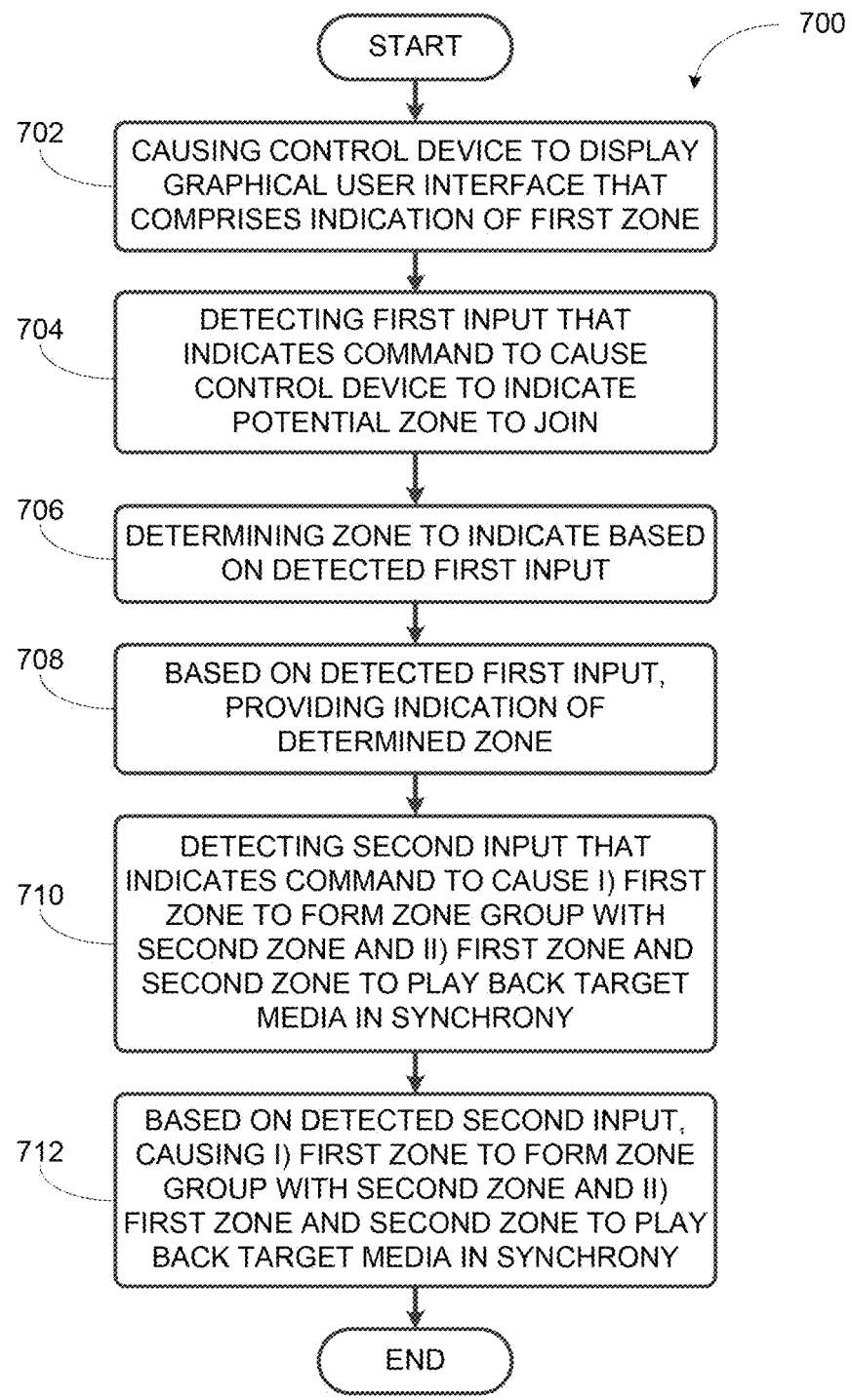
FIG. 7 shows an example flow diagram for another example method to facilitate zone grouping.
Figure 9:
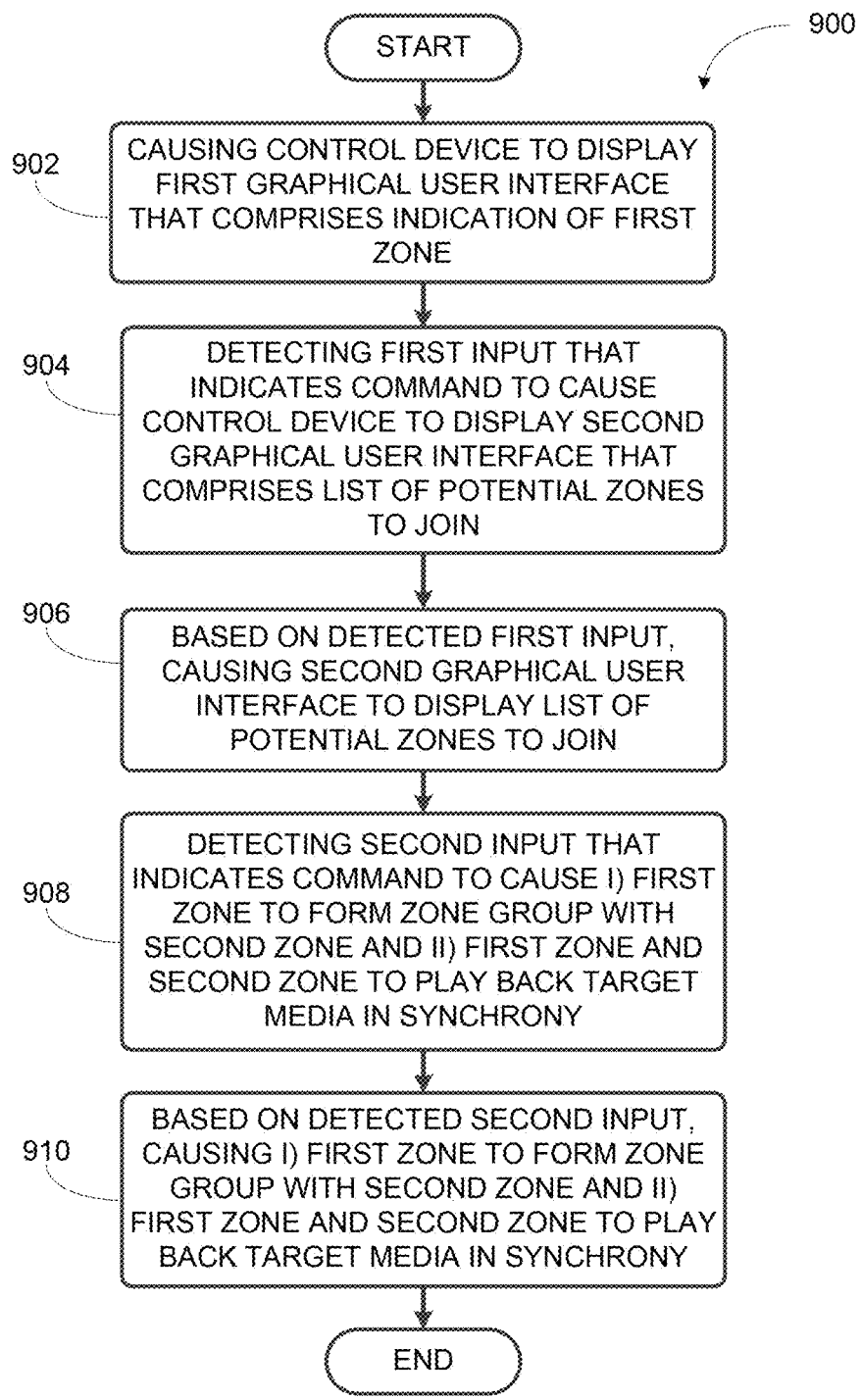
FIG. 9 shows an example flow diagram for another example method to facilitate zone grouping.

Methods 500, 700, and 900 shown in FIGS. 5, 7, and 9 present embodiments of methods that can be implemented within an operating environment involving, for example, the media playback system 100 of FIG. 1, one or more of the playback device 200 of FIG. 2, and one or more of the control device 300 of FIG. 3. Methods 500, 700, and 900 may include one or more operations, functions, or actions as illustrated by one or more of the blocks shown in each Figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500, 700, 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500, 700, 900 and other processes and methods disclosed herein, each block in the Figures may represent circuitry that is wired to perform the specific logical functions in the process.

a. First Example Method to Facilitate Zone Grouping

Figure 6B:
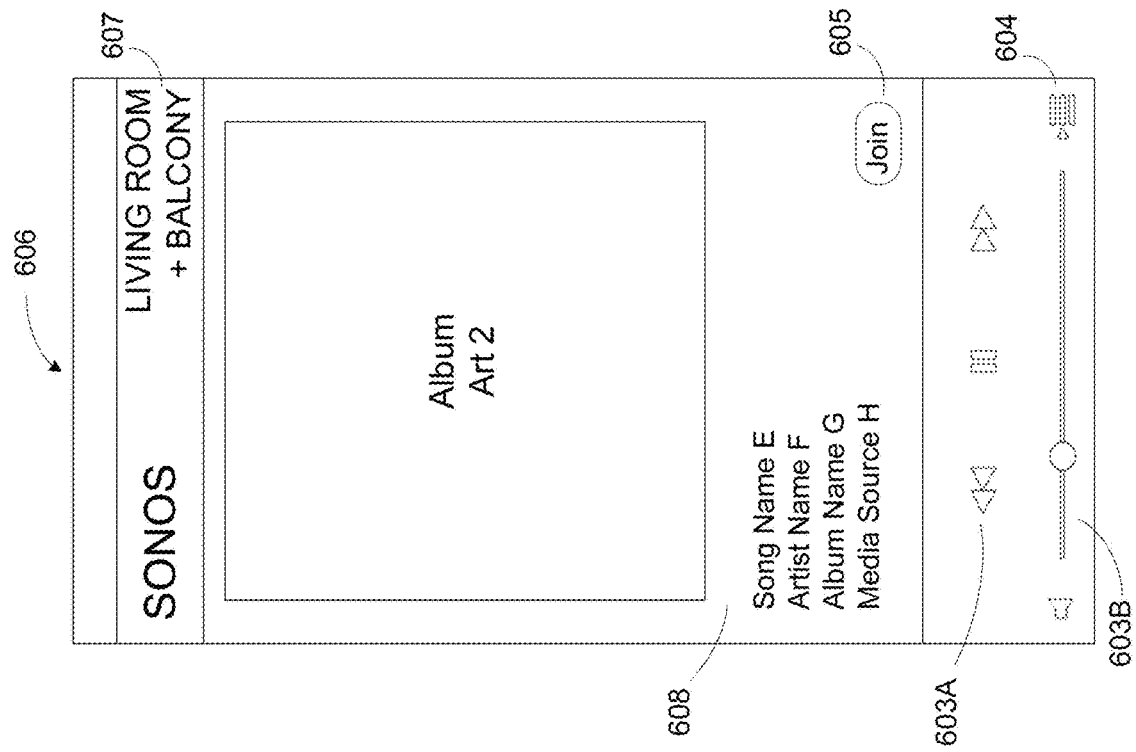
FIG. 6B shows an example display after a zone group has been formed.
Figure 6A:
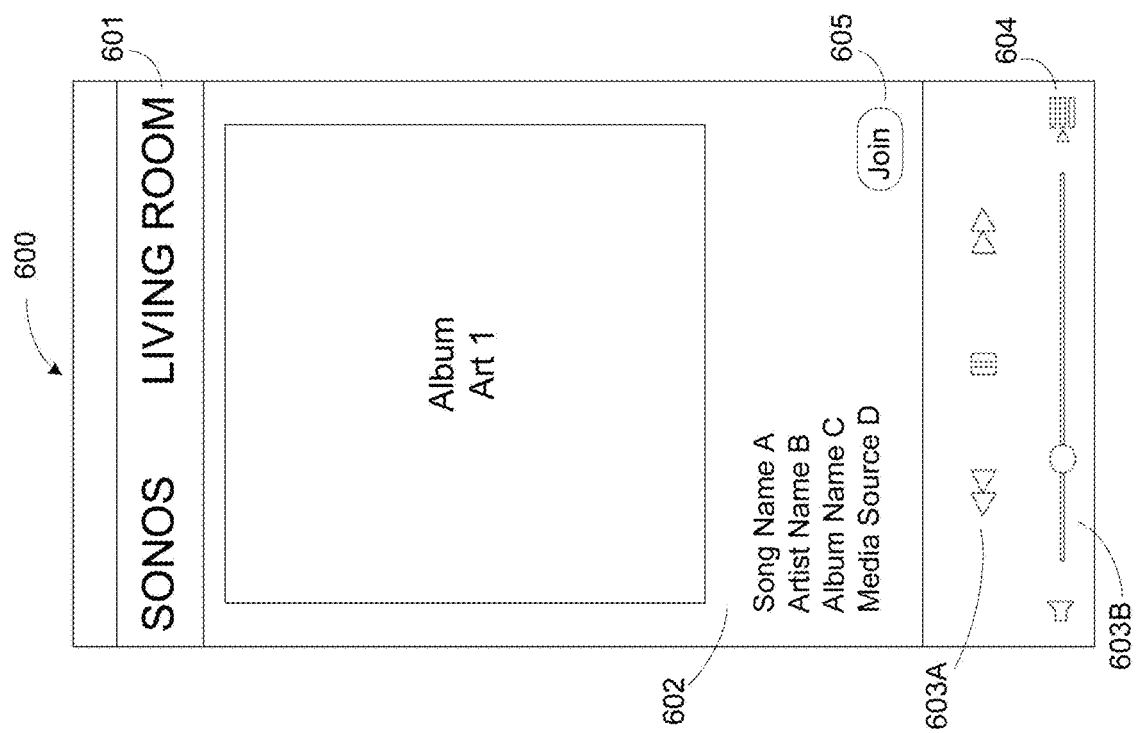
FIG. 6A shows an example graphical user interface that includes an indication of a first zone in a media playback system.

FIGS. 6A-6B illustrate an example of how a control device 300 may display the indications described in method 500. For example, FIG. 6A shows an example graphical user interface 600 of a control device, such as the control device 300 of FIG. 3, at time 1. At block 502, the method 500 may involve causing the control device 300 to display the graphical user interface 600 that comprises an indication 601 of a first zone of a media playback system, such as the media playback system 100 shown in FIG. 1. The first zone may comprise one or more of playback devices 102-124. For instance, in the example shown in FIG. 6A, the first zone may include playback devices 104, 106, 108 and 110 and represent a Living Room zone.

In some implementations, the graphical user interface 600 may include one or more of the features of interface 400 shown in FIG. 4. For example, the graphical user interface 600 may include playback controls 603A, volume controls 603B, and an indication 604 of a menu button for accessing additional features. However, at block 502, while the graphical user interface comprises an indication 601 of the first zone, it might not comprise an indication of a second zone. The indication 601 of the first zone on the graphical user interface 600 may be, for example, a "Now Playing" screen showing an indication 602 of the current media playing in the first zone, or the display of a playback queue for the first zone or. Further, the indication may be a menu screen or settings page for controlling the first zone. Other examples of how the graphical user interface may display an indication of the first zone, but not the second zone, are also possible.

Similar to the first zone, the second zone may include any number of the playback devices 102-124 in the example system 100. For instance, the second zone may include playback device 102 and represent a Balcony zone.

At block 504, the control device 300 may detect an input that indicates a command to cause i) the first zone to form a zone group with the second zone and ii) the first zone and the second zone to play back a target media in synchrony. The input may be a predefined "Join" input, and may take a variety of forms including a touch on a touchscreen, a click of a mouse, a keystroke on a keyboard, a movement detected by an accelerometer or similar sensor, a voice command, and the like. Other examples are also possible, including combinations of these and other possibilities. For instance, the input might be a combination of touch inputs and mouse clicks, or a touch input in combination with a voice command.

The graphical user interface 600 shown in FIG. 6A displays an indication 605 of a specific "Join" button, and the input of block 504 may be a touch of the "Join" button. In another example embodiment where the control device 300 is a device having a touchscreen (e.g., a tablet computer or mobile phone), the input may alternatively be a touch-and-hold (or "long touch") on the touch screen. For instance, any touch on the touchscreen that continues without a release of the touchscreen for a pre-determined period of time, such as two seconds or any other period of time, may be treated as a touch-and-hold by the control device 300 and may indicate the command.

Further, the "Join" input might not need to be placed in a particular location, such as the "Join" button 605 on the graphical user interface 600. Rather, the input, such as a touch-and-hold input, may indicate the command regardless of its location. Alternatively, in some examples the graphical user interface 600 may comprise a specific location for detecting a "Join" input, despite the absence of a specific "Join" button. For example, a touch-and-hold "Join" input may need to be placed on the indication 601 of the first zone to be detected. Other examples are also possible.

Forming the zone group at block 504 may include (i) forming a zone whereby playback devices of the zone group are configured to play back media in synchrony with other playback devices of the zone group. Forming the zone group may additionally involve forming a zone group whereby playback functions (e.g., pause, play, track repeat, track shuffle, or volume) of playback devices of the zone group are configured to be controlled in unison via input(s) received at the control device 300, a particular playback device, and/or another controller.

In some embodiments, the detected input may further indicate a command to detect an active zone that is playing the target media. The control device 300 may detect the active zone, or, as described above, one of the playback devices 102-124 or other computing devices within the system 100 may alternatively detect the active zone. The target media may be media that the second zone is currently playing, media that the first zone is currently playing, or some other media. For example, if the second zone is detected to be currently playing a second media, the second media may be designated as the target media. In other examples, a first media currently playing in the first zone may be designated as the target media. Other examples are also possible.

In some examples, there may be several potential zones in the media playback system 100 that the first zone might join, and one of the potential zones may be determined to be the second zone. For instance, in the example shown in FIG. 6A, the potential zones may include the Balcony zone and the Kitchen zone that are both playing potential target media. The second zone may be determined from the potential zones based on a parameter such as signal strength. For instance, a second playback device 102 in the Balcony zone may have a highest signal strength as detected by a first playback device 108 in the first zone, perhaps indicating that the second playback device 102 is in closest proximity to the first playback device 108 among the detectable playback devices in different zones. In some examples, the first playback device 108 may compare signal strengths of playback devices that are zone coordinators, since the first playback device 108 may ultimately receive media from a group coordinator of the zone that the first playback device joins. The first playback device 108 or the control device 300 may then determine the second zone based on the highest signal strength detected by the first playback device 108.

In another example, the second zone may be determined based on a most recent user interaction time. For instance, a most recent interaction time of a given zone could represent a time when any playback device within the zone last received user input or provided playback of media. It may also represent a time when the playback queue of the given zone was last updated. Other examples of a most recent user interaction time are also possible. Further, the second zone may be determined based on a predetermined alphabetical or numerical order of the potential zones. Other bases for determining the second zone are also possible.

At block 506, the example method 500 may involve, based on the detected input, causing 1) the first zone to form a zone group with the second zone and 2) the first zone and the second zone to play back the target media in synchrony. FIG. 6B shows an example of a second graphical user interface 606 at time 2, after the formation of the zone group. The second graphical user interface 606 may include an indication 607 of the zone group, which here includes the Living Room zone and the Balcony zone, as well as in indication 608 of the target media now being played in synchrony by the first and second zones. Other examples for what the control device 300 may display after the formation of the zone group are also possible.

In various situations, the first zone may form the zone group with the second zone without providing an indication of potential zones for the first zone to join. That is, once the input is detected, the control device 300 may automatically determine the second zone and cause the first zone to form the zone group with the second zone without receiving other inputs.

Figure 6C:
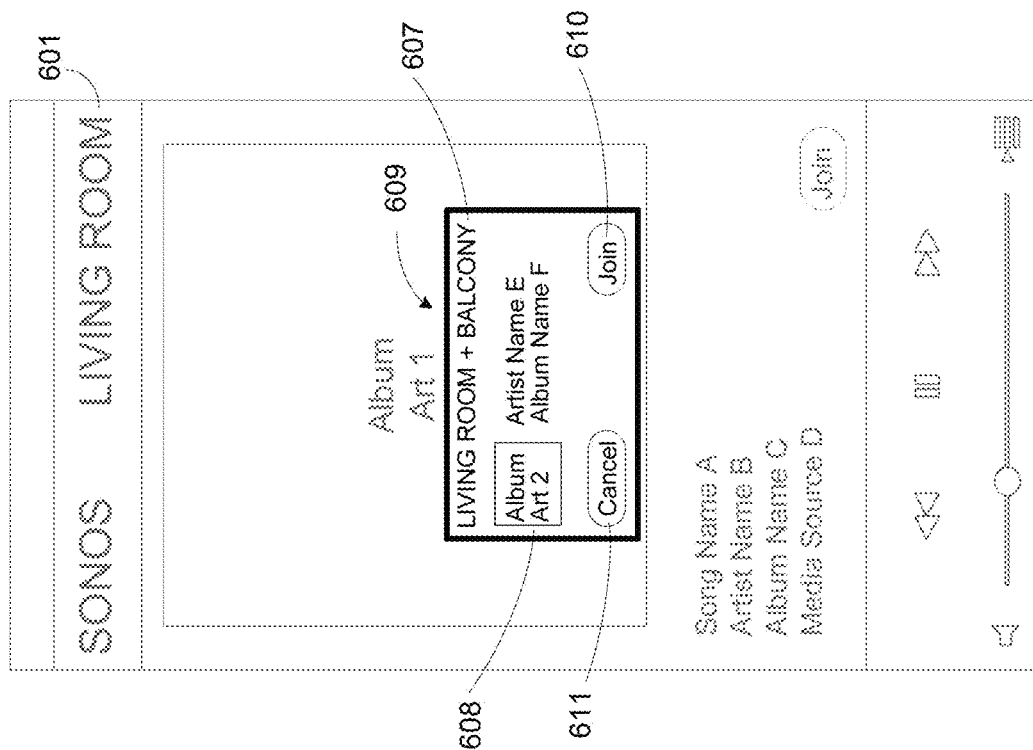
FIG. 6C shows an example indication of a zone group displayed via a second graphical user interface.

Alternatively, the control device 300 may provide for a confirmation interface before the formation of the zone group. Such an example is shown in FIG. 6C, which may occur at an intermediate time between time 1 shown in FIG. 6A and time 2 shown in FIG. 6B. In such examples, the interface that displays the indication of the first zone, as in FIG. 6A, may be a first graphical user interface 600. Further, the input that indicates the command to form the zone group and play back the target media in synchrony may be a second input. Accordingly, before detecting the second input, the control device 300 may detect a first input that indicates a command to cause a second graphical user interface 609 to display an indication 607 of the zone group. In this example that includes the second graphical user interface 609 in FIG. 6C, the interface 606 shown in FIG. 6B, previously described as the second graphical user interface, may instead be a third graphical user interface.

The first input may be a touch-and-hold input or one of the other "Join" inputs described above. Based on the detected first input, the second graphical user interface 609 may display an indication 607 of the zone group. The second graphical user interface 609 may be a pop-up window as shown in the example of FIG. 6C, a confirmation screen, or any other interface. Further, the indication 607 of the zone group on the second graphical user interface 609 may include the names of the first and second zones to be joined, an indication 608 of the media that will be designated as the target media, among other things. The second input may then indicate the command to cause the formation of the zone group, as described above. The second input in this case may take any form. For instance, the second graphical user interface 609 may display an indication 610 of a "Join" button, and the second input may be a click or touch of the "Join" button.

In another case, the control device 300 may detect a "Do Not Join" input indicating a command for the first zone not to form a zone group with the second zone. For example, as shown in FIG. 6C, the second graphical user interface 609 may display an indication 611 of a "Cancel" button along with the indication 607 of the zone group, and the "Do Not Join" input may be a touch of the "Cancel" button. The "Do Not Join" input may further indicate a command to resume playback of media associated with the first zone. For example, detecting the first input may cause the control device 300 or the playback device(s) of the first zone to pause media playback while the indication 607 of the zone group is indicated by the control device 300. Upon detecting the input indicating a command not to form the zone group with the second zone and resume playback of media associated with the first zone, the first zone may resume media playback using a stored file offset or a track time corresponding to a point in the media where playback was paused.

In some embodiments, the control device may cause the formation of the zone group and/or the playing of the target media in synchrony in response to the detected input. In other embodiments, the control device 300 may transmit the indication of the command to one or more additional components of the system 100. In this case, one of the playback devices 102-124 or any other computing device within the system 100 may then cause the formation of the zone group and/or the playing of the target media in synchrony in response to the detected input.

b. Second Example Method to Facilitate Zone Grouping

In some implementations, a control device 300 may provide additional control of media playback system 100. For example, the control device 300 may facilitate joining one of several potential zones. FIGS. 8A-8D illustrate an example of how a control device 300 may display the indications described in method 700. For instance, block 702 may correspond to a time 1 depicted in FIG. 8A. Here, the control device 300 may display a graphical user interface 800 that comprises an indication 801 of a first zone. In this example, the first zone is a Living Room zone indicated on a "Now Playing" screen of the graphical user interface 800. The indication 801 of the first zone is not limited to the display of the zone name, and may alternatively or additionally include other information as well, including an indication 802 of a first media currently playing in the first zone. The indication 802 of the media may include data such as a song name, artist name, album name, album art, or the media source from which the media was obtained. The graphical user interface 800 may also include an interface for control of the media, including playback controls 803A and volume controls 803B, and an indication 804 of a menu button for accessing additional features.

In method 700, the input in block 710 that indicates the command to form the zone group play back the target media in synchrony may be a second input. Accordingly, at block 704, prior to detecting the second input, the control device 300 may detect a first input that indicates a command to cause the control device 300 to indicate a potential zone for the first zone to join. At block 706, based on the detected first input, the control device 300 may determine a potential zone to indicate, which may include the eventual second zone, and then, at block 708, provide an indication of the determined potential zone.

The first input according to method 700 may take a variety of forms. For example, it may be a continuous touch-and-hold anywhere on the display of the graphical user interface 800 shown in FIG. 8A. Alternatively, the graphical user interface 800 may include the display of a "Join" button (not shown), or a similar button, and a touch of the "Join" button may be the first input. Further, the first input might not be limited to a touch on the graphical user interface 800, as noted above.

The indication of the determined potential zone may take several forms. In some examples, causing an indication of a potential zone may involve providing an audio indication of the determined zone. The audio indication may indicate a zone name or a zone number, for example, and may be provided via a speaker on the control device 300 (not shown), or via one or more speakers on one of the playback devices in the first zone, such as the speaker(s) 212 shown in FIG. 2. In other examples, the determined potential zone may be playing a potential media and the indication may involve providing an audio indication of the potential media. The audio indication may include a track name or artist name of a song, for instance. Alternatively, the audio indication may involve providing a sample of the potential media, perhaps by way of playing the potential media itself via a speaker. The sample of the potential media may be provided in synchrony with the playback of the potential media in the determined potential zone, and it may last for a predetermined period of time, such as five or ten seconds. An audio indication may also involve any combination of the example audio indications described above, or any others, provided in a sequence.

Further, the indication of a determined potential zone may involve causing an indication of the potential zone to be displayed on a second graphical user interface of the control device 300. The second graphical user interface may be similar to that described above, and may take the form of a pop-up window, an overlaid menu, or an entirely new screen which replaces the first graphical user interface. For example, after the first input is detected, block 708 may occur at a time 2, as shown in FIG. 8B which depicts a second graphical user interface 805. The indication of the determined potential zone may involve causing an indication 806 of the determined zone to be displayed. In this case, the indication 806 is a zone name for the Balcony zone. The second graphical user interface 805 in FIG. 8B also includes an indication 807 of a second media currently playing in the determined zone. A displayed indication of a potential zone may include all of the indications noted above, in addition to others, and may also be provided simultaneously with any number of the audio indications discussed above.

In another aspect, the determination of the potential zone to indicate based on the detected first input may involve determining a sequence of potential zones, where at least one potential zone in the sequence includes the eventual second zone. FIG. 8C shows the example display of control device 300 at time 3. Here, the second graphical user interface 805 displays an indication 810 of another zone in the sequence of potential zones, here a Kitchen zone, including an indication 811 of the media currently playing in that zone. The sequence of potential zones may be determined in a variety of ways. For instance, signal strengths corresponding to respective zones may be detected and the sequence may be determined based on the detected signal strengths of the respective zones. Alternatively, most recent user interaction times of respective zones may be determined and the sequence may be determined based on the determined most recent user interaction times of the respective zones. Further, a random order for the sequence may be determined. As another example, the sequence may be determined based on alphabetical order of a zone name for each respective zone. Similarly, the sequence may be determined based on numerical order of a zone number for each respective zone. For any of the examples provided, the control device 300 may perform the determination and/or detection steps, or one of the playback devices or other computing devices in the media playback system 100 may do so. Other examples are possible. In some embodiments, the sequence may repeat in a loop, with each potential zone indicated for a predetermined period of time, such as two seconds or any other time, with the first potential zone following the last until a second input is detected.

Consequently, after the first input is detected and the sequence of potential zones is indicated, the second input may be detected at a time corresponding to the indication of the potential zone that is to be the second zone. In this way, the second input may indicate the second zone as well as indicate the command to form the zone group. For example, if the second input is detected at time 3, corresponding to FIG. 8C, it may indicate a command for the Living Room zone to form a zone group with the Kitchen zone and play back the media that is currently playing in the Kitchen zone in synchrony. If the second input is detected at an earlier or later time, when a different potential zone is being indicated on the second graphical user interface 805, it may indicate a command to form a zone group with that potential zone.

FIG. 8D shows an example display of the control device 300 at time 4, after the second input is detected and after the zone group has been formed. A third graphical user interface 812 may display an indication 813 of the newly formed zone group, as well as an indication 811 of the media now being playing in synchrony. Other examples of what may be displayed on the control device 300 after the formation of the zone group are also possible.

As suggested above, the first input in method 700 may take the form of a continuous touch-and-hold of the first graphical user interface for at least a predetermined period of time. The minimum time for a touch-and-hold input may be, for example, a half of a second, one second, or any other time. The second input, the detection of which causes the zone group to be formed and the target media to be played in synchrony at block 712, may be a release of the first graphical user interface. Alternatively, as shown in FIGS. 8B and 8C, the second graphical user 805 interface may display an indication of a "Join" button 809, or a similar button. In this case, a touch of the "Join" button 809 may be the second input. Other examples are also possible.

In another case, the control device 300 may detect a "Do Not Join" input indicating a command for the first zone not to form a zone group with the second zone. For example, as shown in FIGS. 8B and 8C, the second graphical user interface 805 may display an indication 808 of a "Cancel" button along with the sequence of potential zones to join, and the "Do Not Join" input may be a touch of the "Cancel" button. The "Do Not Join" input may further indicate a command to resume playback of media associated with the first zone. For example, detecting the first input may cause the control device 300 or the playback device(s) of the first zone to pause media playback while potential zones for the first zone to join are indicated by the control device 300. Upon detecting the input indicating a command not to form the zone group with the second zone and resume playback of media associated with the first zone, the first zone may resume media playback using a stored file offset or a track time corresponding to a point in the media where playback was paused.

c. Third Example Method to Facilitate Zone Grouping

Figure 10A:
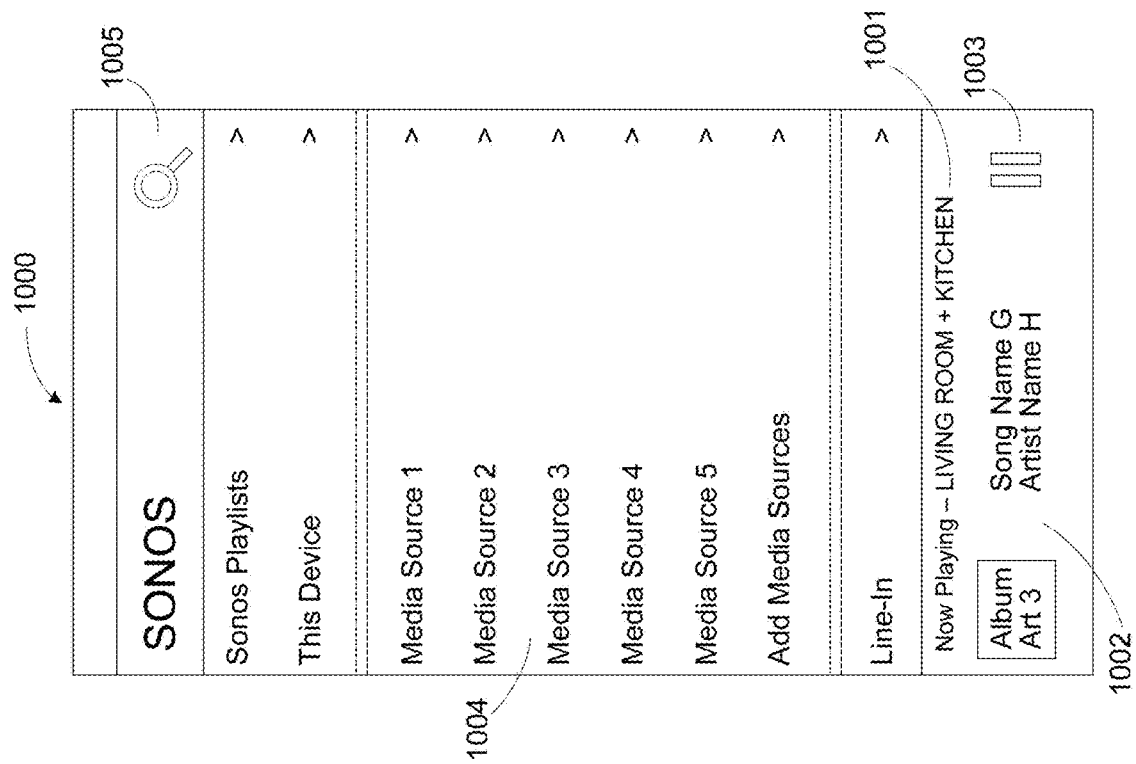
FIG. 10A shows an example indication of a first graphical user interface that includes an indication of a first zone in a media playback system.

Another example embodiment is illustrated by the method 900 of FIG. 9, and FIGS. 10A-10D illustrate one example of how a control device 300 might display the indications described in method 900. For instance, block 902 may correspond to a time 1 depicted in FIG. 10A. Here, the control device 300 may display a first graphical user interface 1000 that comprises an indication 1001 of a first zone of a media playback system and an indication 1002 of a first media currently playing in the first zone. The media playback system may comprise the first zone and a second zone, and the first graphical user interface 1000 may not comprise an indication of the second zone. In FIG. 10A, the first zone is in a zone group comprising both the Living Room zone and the Kitchen zone. Further, instead of the "Now Playing" screen shown in FIGS. 8A-8D, the first graphical user interface 1000 in FIG. 10A displays a menu comprising a list 1004 of media sources that may be used to add media to the playback queue of the zone group. The first graphical user interface 1000 may also include indications 1003, 1005 for other controls and commands, such as a media playback control and search command, respectively.

At block 904, the control device 300 may detect a first input that indicates a command to cause a second graphical user interface to display a list of potential zones for the first zone to join. One of the potential zones may include the second zone, but other potential zones are also possible. And at block 906, the control device 300 may cause the second graphical user interface to display the list of potential zones for the first zone to join.

The second graphical user interface may take a form similar to those described above. For instance, it may include a pop-up window, an overlaid menu, or an entirely new screen which replaces the first graphical user interface. The second graphical user interface may display all of the potential zones in the list simultaneously, or it may display only a portion of the list at a given time. For instance, the number of potential zones might be too numerous to effectively indicate at one time within a display area of the second graphical user interface. In such a case, the control device 300 may be operable to detect an input indicating a command to scroll or pan the list to display a second portion of the list. Other examples of the second graphical user interface that may more effectively display the list of potential zones are also possible.

FIG. 10B shows an example display of the control device 300 at a time 2, after the first input is detected. The display includes a second graphical user interface 1006 that displays a list 1007 of the potential zones for the first zone to join. The list 1007 includes an indication of each potential zone, and an indication 1008 of the media playing in each potential zone, which may be potential media to be played in synchrony and may include the target media. An indication 1009 of additional target media that is not currently being played in one of the potential zones may also be displayed on the second graphical user interface 1000. For instance, a list 1010 of the "Most Played Media" in the media playback system may be displayed. Unassigned playback queues and other examples are also possible.

The second graphical user interface 1006 may also display indications of a respective selection for both the potential zones and the potential media. For example, in FIG. 10B the Living Room, Balcony, and Dining Room zones have been indicated from the list 1007 by selecting a radio button 1011 adjacent to each potential zone. Similarly, a target media from the list 1010 of "Most Played Media" has been indicated by selecting a similar radio button 1012. In some examples, an indication of a "Select All" radio button (not shown) may be displayed along with the list 1007 of potential zones.

The potential zones comprising the list 1007 may be determined based on a variety of factors. In some embodiments, the media playback system, such as the media playback system 100, may comprise a plurality of zones. In one example, the list of potential zones may include every zone in the plurality of zones that is playing back media from a respective playback queue. As described above, the control device 300 may detect the active zones that are playing back media. Alternatively, a playback device may detect the zones that are playing back media and then indicate the zones to the control device 300 for display in the list of potential zones.

In another example, the list of potential zones may include every zone in the plurality of zones that has media in a respective playback queue. This may include all zones that are currently playing back media from a respective playback queue, but may also include any zone that has media in a playback queue but is not playing the media because playback has been paused, for instance. Again, the control device 300 or a playback device may detect the zones that have media in a playback queue. In yet another example, the list of potential zones may include every zone in the plurality of zones.

In FIG. 10B, the list 1007 includes every zone in the plurality of zones of the media playback system. The zones that are currently playing media or have media in a playback queue each have a corresponding indication 1008 of the media. Some zones, such as the Office and Master Bedroom zones, might not have media in a playback queue and thus may not have a corresponding indication of media displayed. However, in some examples such as the one shown in FIG. 10B, they may still be selected for inclusion in the formed zone group.

Additionally, the first zone in the example of FIGS. 10A-10B is part of a first zone group that comprises a first zone and a third zone. In some examples, the detection of the first input may also cause the second graphical user interface 1006 to display a list of zones within the first zone group. As shown in FIG. 910B at time 2, both the Living Room and Kitchen zones are included in the list 1007. In some examples, the control device 300 may require the selection of one of the zones within the first zone group before the second input may be received.

At block 908, the control device 300 may detect a second input that indicates a command to cause the first zone to form a zone group with the second zone and further cause the first zone and the second zone to play back a target media in synchrony. In some examples, as described herein, the formed zone group may be a second zone group.

At block 910, the control device may, based on the detected second input, cause the first zone to form a (second) zone group with the second zone and further cause the first zone and the second zone to play back the target media in synchrony. As noted above, the target media may be a first media being played by the first zone, a second media being played by the second zone, or some other media. FIG. 10C shows an example display of the control device 300 at time 3, after the second input is detected and after the (second) zone group has been formed. A third graphical user interface 1015 may display an indication 1016 of the newly formed zone group, as well as an indication 1009 of the media now being playing in synchrony. FIG. 10C depicts an example "Now Playing" screen with playback controls 1003A and 1003B, and an indication 1017 of a menu button for accessing additional features. Other examples of what may be displayed on the control device 300 after the formation of the zone group are also possible.

The first and second inputs may also take a variety of forms, as noted above. As one example, the first input may be a touch-and-hold (for a predetermined time) of the first graphical user interface, indicating the command to display the list of potential zones. The second input may then be a touch of the second graphical user interface that displays the list. For example, as shown in FIG. 10B, the second graphical user interface 1006 may display an indication of a "Join" button 1014, and the second input may be a touch of the "Join" button 1014. In other examples, detection of a touch corresponding to one of the potential zones displayed in the list 1007 may indicate that zone as the second zone and cause the formation of the (second) zone group, using the media currently being played in the second zone as the target media. In this way, detection of the second input may indicate the second zone from the list of potential zones, in addition to causing the formation of the zone group to play back the target media in synchrony.

In some cases, the control device 300 may detect a "Do Not Join" input indicating a command for the first zone not to form a zone group with the second zone. For example, as shown in FIG. 10B, the second graphical user interface 1006 may display an indication of a "Cancel" button 1013 along with the list 1007 of potential zones to join, and the "Do Not Join" input may be a touch of the "Cancel" button 1013. The "Do Not Join" input may further indicate a command to resume playback of media associated with the first zone that was paused based on the first input, as noted above with respect to the methods 500 and 700.

At blocks 506, 712, and 910, the respective methods 500, 700, and 900 each include, based on the detected (second) input, causing (i) the first zone to form a zone group with the second zone and (ii) the first zone and second zone to playback the target media in synchrony. For example, causing the first zone to playback the target media in synchrony with the second zone may include a first playback device in the first zone receiving the media from a second playback device in the second zone. The second playback device may send the media to the first playback device in response to the control device sending to the second playback device an indication of the command to form the zone group and playback the target media in synchrony. Alternatively, the first playback device may send the second playback device an indication of the command.

Figure 11:
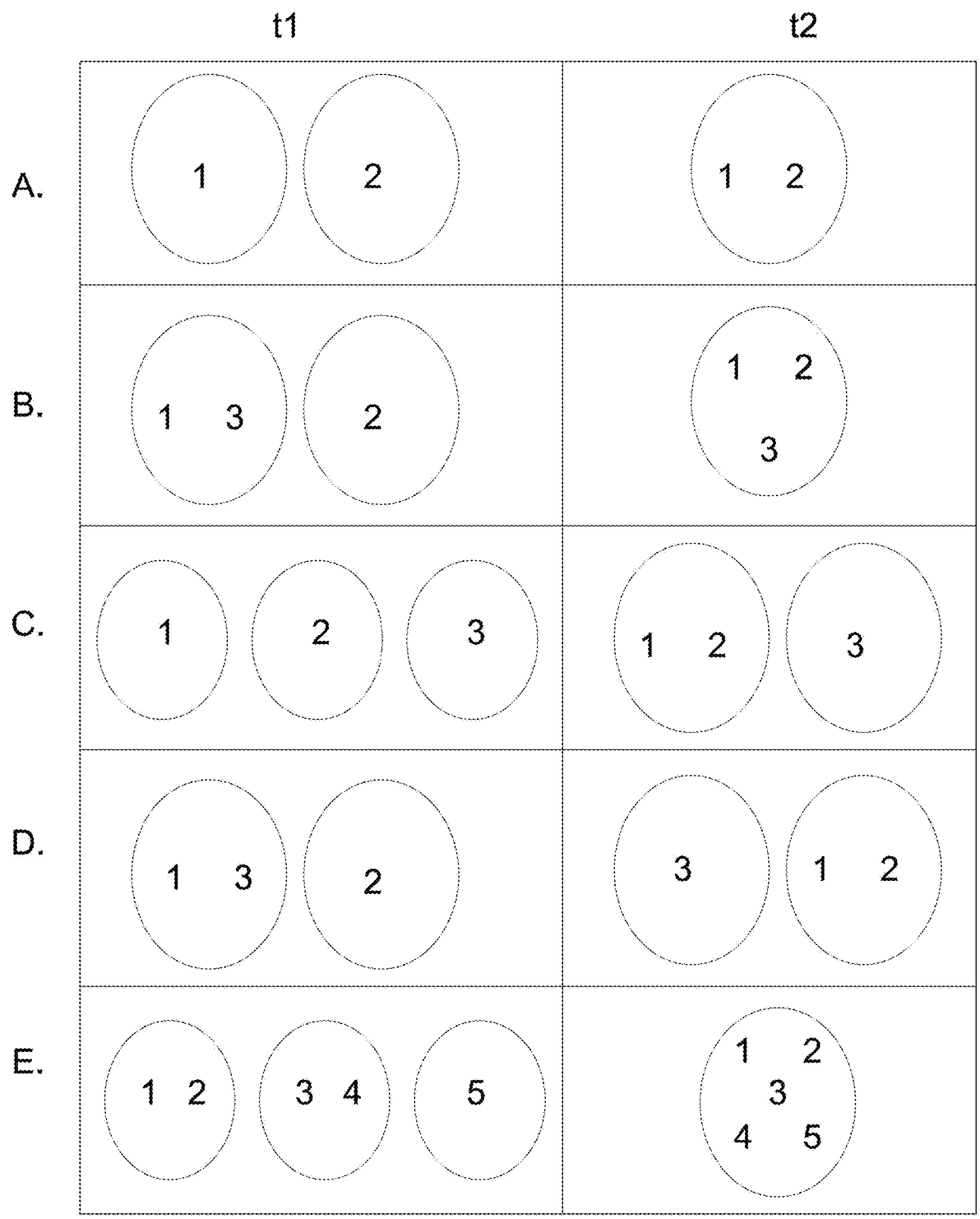
FIG. 11 shows example zones and example zone group formations.

Some conceptual examples of the joining of zones and the forming of zone groups, as described above with respect to blocks 506, 712, and 910, are illustrated in FIG. 11. Row A of FIG. 11 illustrates one example by showing, at time t1 (shortly before the control device detects the input indicating a command to form the zone group), a first zone and a second zone. At time t2, shortly after the control device detects the (second) input indicating the command to form the zone group, the first and second zones are included in a single zone group for synchronous playback of the target media.

In some instances, before detecting the (second) input indicating the command for the first zone to form a zone group with the second zone, the first zone may be within a first zone group that also includes a third zone. In this case, the zone group that is formed based on the detected (second) input is a second zone group. For example, based on the detected (second) input, the control device 300 may further cause the third zone to form the second zone group with the first and second zones, and cause the third zone to play back the target media in synchrony with the first and second zones (i.e., the third zone "follows" the first zone). Row B of FIG. 11 depicts this example conceptually by depicting, at time t1, a first zone and a third zone within a first zone group and a second zone by itself. At time t2, the first, second, and third zones are included in a second zone group for synchronous playback of the target media.

In the example shown with respect to Row B, a first playback device in the first zone may be a zone group coordinator of the first zone group prior to forming the second zone group with the second zone. As the zone group coordinator, the first playback device may control or communicate with other playback devices of the first zone group in various ways. For instance, the zone group coordinator may provide media and/or timing information to other playback devices of the zone group. Alternatively, a third playback device in the third zone may be the zone coordinator of the first zone group. Any of the control device, the first playback device, or the third playback device can determine the zone or zone group that the first and third zones may join. Alternatively, the control device or playback device can communicate with a second playback device in the second zone (or a zone group coordinator of the second zone group) to facilitate the first and third zones joining the second zone group.

In another example depicted in Row C of FIG. 11, shortly before detecting the (second) input indicating the command to form the zone group (e.g., at t1), both a second zone and a third zone may be potential zones for the first zone to join. The zones are indicated as zones "two" and "three" at t1 for illustrative purposes only. They may also be illustrated as zones "three" and "two" because at t1, a determination or indication of the second zone (i.e., an indication of the zone that will form the zone group with the first zone) may not have occurred yet. Examples of such a determination or indication of the second zone are described in detail above. In any case, at t2, the control device 300 may, based on the (second) input indicating the command to form the zone group, cause the first zone to form the zone group with the indicated second zone, leaving the third zone by itself.

In one example comprising the detection of multiple inputs, the first zone may be within a first zone group comprising a third zone before receiving the second input. Here, a first input may indicate a command to cause the graphical user interface of the control device 300 to display a list of the zones within a first zone group. Then, based on the detected first input, the control device 300 may cause the graphical user interface to display the list of zones. In this embodiment, the second input that indicates the command to form the zone group may further indicate the zone or zones within the first zone group that will form the second zone group with the second zone. For example, detecting the first input may cause the control device 300 to display an indication of the Living Room (first) zone and the Balcony (third) zone that are currently in a first zone group. The second input may indicate only the Living Room zone to form the second zone group with the Kitchen (second) zone and play back the target media in synchrony. Based on the detected second input, the control device may cause the third zone to stop playing back media. Alternatively, the third zone may continue to play a second media that it was playing prior to the detection of the second input.

Accordingly, in a situation depicted in Row D of FIG. 11, prior to receiving the input at the control device 300 (e.g., at time t1), the first zone may be included in a first zone group with a third zone, while the second zone is by itself. In response to the detected input, the first and second zones may form a zone group and playback the target media in synchrony. The control device may cause the third zone to playback a second media, or alternatively, no media, while the first and second playback devices playback the target media in synchrony (e.g., at time t2). That is, the input indicates a command for the first zone to leave the first zone group to join the second zone group while the third zone "stays behind."

Prior to the first zone leaving the first zone group that includes the third zone to form a second zone group with the second zone, a first playback device in the first zone may act a zone coordinator of the first zone group. When the first zone, and thus the first playback device, leaves the first zone group, the control device may cause a third playback device in the third zone to become a (new) zone coordinator of the first zone group. In some cases, if the third zone is the only zone that remains, as shown in the example of Row C in FIG. 11, the third playback device may become the zone coordinator of the third zone.

The control device may determine the third playback device to become the zone coordinator of the first zone group based on respective signal strengths of playback devices of the first zone group detected by the control device. That is, the control device may detect the signal strengths of various playback devices of the first zone group so that the control device can determine the new zone coordinator. By way of example, the third playback device, or any remaining playback device of the first zone group, may be most centrally located within the first zone group and best suited to control the playback devices of the first zone group. In this way, the new zone coordinator of the first zone group may be determined based on the new zone coordinator's capability to effectively communicate with other playback devices of the first zone group. Additionally, the steps described above of detecting and determining signal strengths of playback devices and determining a new zone coordinator may be carried out by the third playback device. They may also be carried out by any combination of the control device, the third playback device, and any other playback device.

In another example, the control device may determine which of various playback devices of the first zone has a strongest communication link to playback devices of the second zone group (e.g., average signal strengths of playback devices of the second zone detected by playback devices of the first zone), and cause the playback device of the first zone with the strongest communication link to the second zone group to become a (new) zone coordinator of the second zone group. Alternatively, a first playback device in the first zone may determine the described signal strengths, and cause the playback device of the first zone with the strongest communication link to the second zone group to become the (new) zone coordinator.

So that the control device may determine a given playback device to be a new zone coordinator, data representing various states of playback devices may be stored in a table within a memory (e.g., memory 304 of FIG. 3) of the control device, or a playback device (e.g., memory 206 of FIG. 2) that is in communication with the control device. The device storing the data may share the data with the other playback devices via UPnP (Universal Plug and Play) protocols and may update the stored data in response to state changes of the media playback devices (e.g., a playback device leaving or joining a zone, starting or stopping playback of media, or becoming or ceasing to be a zone coordinator). For example, such a table could be a data array with rows representing various playback devices and columns representing data such as (i) a zone identifier indicating the zone or zone group of a corresponding playback device, (ii) a bit indicating whether or not the corresponding playback device is a zone coordinator of the indicated zone group (an ungrouped playback device may be a zone coordinator by default), and (iii) whether the corresponding playback device (i.e., a corresponding playback zone) is currently playing back media, among other possibilities. In other examples, the control device may query a playback device (e.g., a zone coordinator) for such information as needed.

In yet another example, the media playback system 100 may include a plurality of zones, and detection of the (second) input by the control device 300 may cause the first zone to form a zone group with all zones in the plurality of zones, and to further play back the target media in synchrony with all zones in the plurality of zones. Row E of FIG. 11 illustrates an example, where at t1, the first zone and second zone are in a first zone group, the third and fourth zones are in a second zone group, and a fifth zone is by itself. At t2, after the detection of the input indicating the command to form the zone group, all zones have been joined into a single zone group for the synchronous playback of the target media.

In another example, when the input indicating the command to form the zone group is detected by the control device 300, there may be no other zones engaging in playback of media. Here, it is possible that detecting the input either has no effect on the first zone, or it may cause the first zone to form a zone group with the second zone such that when playback of new media is initiated in the second zone, the first zone will join the second zone in synchronous playback of the new media.

One of skill in the art will also appreciate that while this disclosure provides examples of a media playback system including media playback devices that are grouped in response to detected inputs, similar interactions could take place in other areas of home or office automation. For example, an input could be detected by a control device having a graphical user interface displaying an indication of a dishwasher, causing the dishwasher to assume a common operation schedule (i.e., form a zone group) with a washer and a dryer. This could cause the dishwasher to turn on or turn off in synchrony with the washer and/or dryer, to consume electricity at off-peak hours, for example. Or as another example, an input could be detected by a control device having a graphical user interface displaying an indication of a lighting module in a living room, causing the lighting module to form a "zone group" with a lighting module in a kitchen, for instance. This grouping may cause the lighting module in the living room to assume the operation schedule of the lighting module in the kitchen. This may cause the lighting modules to turn on, turn off, or dim according to a common schedule. Other examples are possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves a control device detecting an input that (i) causes a zone group to be formed from two or more zones in a media playback system and (ii) causes the grouped zones to play back media in synchrony. In one aspect, a method is provided. The method involves causing a control device to display a graphical user interface that includes an indication of a first zone of a media playback system, where the media playback system includes the first zone and a second zone, and where the graphical user interface does not include an indication of the second zone; detecting, by the control device, an input that indicates a command to cause (i) the first zone to form a zone group with the second zone and (ii) the first zone and the second zone to play back a target media in synchrony; and based on the detected input, causing (i) the first zone to form a zone group with the second zone and (ii) the first zone and the second zone to play back the target media in synchrony.

In another aspect, a method is provided. The method involves causing a control device to display a first graphical user interface that includes an indication of a first zone of a media playback system, where the media playback system includes the first zone and a second zone, and where the first graphical user interface does not include an indication of the second zone; detecting, by the control device, a first input that indicates a command to cause the control device to display a second graphical user interface that includes a list of potential zones for the first zone to join, where at least one of the potential zones includes the second zone; based on the detected first input, causing the second graphical user interface to display the list of potential zones for the first zone to join, where at least one of the potential zones includes the second zone; detecting, by the control device, a second input that indicates a command to cause (i) the first zone to form a zone group with the second zone and (ii) the first zone and the second zone to play back a target media in synchrony; and based on the detected second input, causing (i) the first zone to form a zone group with the second zone and (ii) the first zone and the second zone to play back the target media in synchrony.

In yet another aspect, a device is provided. The device includes a processor, a network interface, a graphical user interface, a non-transitory computer readable medium, and program instructions stored on the non-transitory computer readable medium executable by the processor to cause the control device to perform functions, where the functions include: causing the control device to display the graphical user interface that includes an indication of a first zone of a media playback system, where the media playback system includes the first zone and a second zone, and where the graphical user interface does not include an indication of the second zone; detecting, by the control device, an input that indicates a command to cause (i) the first zone to form a zone group with the second zone and (ii) the first zone and the second zone to play back a target media in synchrony; and, based on the detected input, causing (i) the first zone to form a zone group with the second zone and (ii) the first zone and the second zone to play back the target media in synchrony.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:
   a user interface;
   at least one processor;
   at least one non-transitory computer readable medium; and
   program instructions stored on the at least one non-transitory computer readable medium that are executable by the at least one processor such that the computing device is configured to:
   play back given media content;
   while playing back the given media content, determine that a first playback device is available to play back the given media content, wherein the first playback device is grouped with at least a second playback device for synchronous playback of media content;
   display, via the user interface, a selectable indication that the first playback device is available to play back the given media content, wherein the selectable indication that the first playback device is available to play back the given media content does not comprise an indication of the second playback device;
   detect user input indicating a selection of the selectable indication that the first playback device is available to play back the given media content;
   based on the user input, cause the first playback device, and not the second playback device, to begin playing back the given media content; and
   after causing the first playback device to begin playing back the given media content, display an indication of playback of the given media content by the first playback device.

2. The computing device of claim 1, wherein the program instructions that are executable by the at least one processor such that the computing device is configured to cause the first playback device to begin playing back the given media content further comprise program instructions that are executable by the at least one processor such that the computing device is configured to:
   cause the first playback device to become ungrouped from at least the second playback device for synchronous playback of media content.

3. The computing device of claim 1, wherein the program instructions that are executable by the at least one processor such that the computing device is configured to cause the first playback device to begin playing back the given media content further comprise program instructions that are executable by the at least one processor such that the computing device is configured to:
   cease playing back the given media content.

4. The computing device of claim 1, wherein the computing device is configured to communicate with the first playback device via at least one communication protocol, and wherein the program instructions that are executable by the at least one processor such that the computing device is configured to determine that the first playback device is available to play back the given media content further comprise program instructions that are executable by the at least one processor such that the computing device is configured to:
   based on a respective network signal strength of at least the first playback device and the second playback device, determine that the first playback device is within a threshold proximity of the computing device.

5. The computing device of claim 4, wherein the at least one communication protocol comprises a communication protocol in accordance with IEEE 802.11 standards.

6. The computing device of claim 4, wherein the at least one communication protocol comprises a communication protocol in accordance with IEEE 802.15 standards.

7. The computing device of claim 1, wherein the program instructions that are executable by the at least one processor such that computing device is configured to determine that the first playback device is available to play back the given media content further comprise program instructions that are executable by the at least one processor such that the computing device is configured to:
   based on respective playback interaction information for at least the first playback device and the second playback device, determine that the first playback device has a most-recent playback interaction.

8. The computing device of claim 7, wherein the most-recent playback interaction comprises one or more of (i) receipt of an indication of a user command, (ii) playback of media content, or (iii) an update to a playback queue associated with the first playback device.

9. The computing device of claim 1, wherein the program instructions that are executable by the at least one processor such that the computing device is configured to determine that the first playback device is available to play back the given media content comprise program instructions that are executable by the at least one processor such that the computing device is configured to:
   based on respective playback history for at least the first playback device and the second playback device, determine that the first playback device is available to play back the given media content.

10. The computing device of claim 1, further comprising program instructions stored on the at least one non-transitory computer readable medium that are executable by the at least one processor such that the computing device is configured to:
    before displaying the selectable indication that the first playback device is available to play back the given media content, receive user input indicating a command to display one or more playback devices that are available to play back the given media content.

11. The computing device of claim 1, wherein the computing device is a smart phone.

12. A non-transitory computer readable medium, wherein the non-transitory computer readable medium is provisioned with program instructions that, when executed by at least one processor, cause a computing device to:
    play back given media content;
    while playing back the given media content, determine that a first playback device is available to play back the given media content, wherein the first playback device is grouped with at least a second playback device for synchronous playback of media content;
    display, via a user interface of the computing device, a selectable indication that the first playback device is available to play back the given media content, wherein the selectable indication that the first playback device is available to play back the given media content does not comprise an indication of the second playback device;

detect user input indicating a selection of the selectable indication that the first playback device is available to play back the given media content;

based on the user input, cause the first playback device, and not the second playback device, to begin playing back the given media content; and after causing the first playback device to begin playing back the given media content, display an indication of playback of the given media content by the first playback device.

13. The non-transitory computer readable medium of claim 12, wherein the program instructions that, when executed by at least one processor, cause the computing device to cause the first playback device to begin playing back the given media content further comprise program instructions that, when executed by at least one processor, cause the computing device to:

cause the first playback device to become ungrouped from at least the second playback device for synchronous playback of media content.

14. The non-transitory computer readable medium of claim 12, wherein the program instructions that, when executed by at least one processor, cause the computing device to cause the first playback device to begin playing back the given media content further comprise program instructions that, when executed by at least one processor, cause the computing device to:

cease playing back the given media content.

15. The non-transitory computer readable medium of claim 12, wherein the computing device is configured to communicate with the first playback device via at least one communication protocol, and wherein the program instructions that, when executed by at least one processor, cause the computing device to determine that the first playback device is available to play back the given media content further comprise program instructions that, when executed by at least one processor, cause the computing device to:

based on a respective network signal strength of at least the first playback device and the second playback device, determine that the first playback device is within a threshold proximity of the computing device.

16. The non-transitory computer readable medium of claim 12, wherein the program instructions that, when executed by at least one processor, cause the computing device to determine that the first playback device is available to play back the given media content further comprise program instructions that, when executed by at least one processor, cause the computing device to:

based on respective playback interaction information for at least the first playback device and the second playback device, determine that the first playback device has a most-recent playback interaction.

17. The non-transitory computer readable medium of claim 12, wherein the program instructions that, when executed by at least one processor, cause the computing device to determine that the first playback device is available to play back the given media content comprise program instructions that, when executed by at least one processor, cause the computing device to:

based on respective playback history for at least the first playback device and the second playback device, determine that the first playback device is available to play back the given media content.

18. The non-transitory computer readable medium of claim 12, wherein the non-transitory computer readable medium is also provisioned with program instructions that, when executed by at least one processor, cause the computing device to:

before displaying the selectable indication that the first playback device is available to play back the given media content, receive user input indicating a command to display one or more playback devices that are available to play back the given media content.

19. A method carried out by a computing device, the method comprising:

playing back given media content;

while playing back the given media content, determining that a first playback device is available to play back the given media content, wherein the first playback device is grouped with at least a second playback device for synchronous playback of media content;

displaying, via a user interface of the computing device, a selectable indication that the first playback device is available to play back the given media content, wherein the selectable indication that the first playback device is available to play back the given media content does not comprise an indication of the second playback device;

detecting user input indicating a selection of the selectable indication that the first playback device is available to play back the given media content;

based on the user input, causing the first playback device, and not the second playback device, to begin playing back the given media content; and after causing the first playback device to begin playing back the given media content, displaying an indication of playback of the given media content by the first playback device.

20. The method of claim 19, wherein causing the first playback device to begin playing back the given media content further comprises:

causing the first playback device to become ungrouped from at least the second playback device for synchronous playback of media content.

* * * * *